United States Patent
Billings et al.

(10) Patent No.: US 6,249,393 B1
(45) Date of Patent: Jun. 19, 2001

(54) DISK DRIVE HAVING A WRITE CONDITION DETECTOR FOR SUSPENDING WRITE OPERATIONS WHILE A TRANSDUCER FLYING HEIGHT DEVIATES FROM ITS OPERATING FLYING HEIGHT

(75) Inventors: Russell A. Billings; Shafa Dahandeh; Mark D. Hagen, all of Rochester, MN (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/098,319

(22) Filed: Jun. 16, 1998

(51) Int. Cl.[7] ................... G11B 27/36; G11B 15/04; G11B 21/02
(52) U.S. Cl. .................... 360/31; 360/60; 360/75
(58) Field of Search ..................... 360/31, 61, 75, 360/103, 77.08, 60

(56) References Cited

U.S. PATENT DOCUMENTS

| 4,766,508 | * | 8/1988 | Mathewson | 360/77.07 |
| 4,777,544 | | 10/1988 | Brown et al. | |
| 5,377,058 | | 12/1994 | Good et al. | |
| 5,410,439 | | 4/1995 | Egbert et al. | |
| 5,831,781 | * | 11/1998 | Okamura | 360/31 |
| 5,909,330 | * | 6/1999 | Carlson et al. | 360/31 |

* cited by examiner

Primary Examiner—Regina Y. Neal
(74) Attorney, Agent, or Firm—Milad G Shara

(57) ABSTRACT

A disk drive with a write condition detector generates a write condition signal from a reference signal to warn of a high fly write or a low fly write. The reference signal is generated by the disk drive read/write head by reading a reference segment. The write condition detector processes fly-height varying components from the reference signal. The write condition detector generates a write condition signal, responsive to the fly-height varying components and the threshold, that indicates that the writing of data in a user data segment during the write operation is unsafe when the head deviates from its operating flying-height. The threshold is computed using zone coefficients determined during an intelligent burn in of the disk drive, and is based on a nominal fly height. The write condition signal is processed by a microprocessor that instructs a disk controller to deactivate a write gate controlling the write operation. The disk drive then implements verification, diagnostics and recovery steps to complete the write operation.

23 Claims, 16 Drawing Sheets

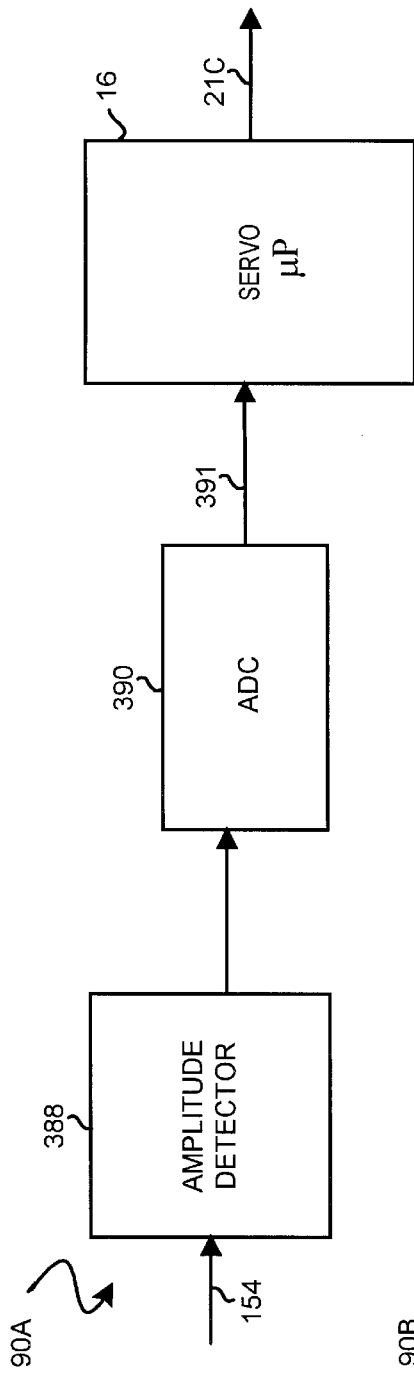
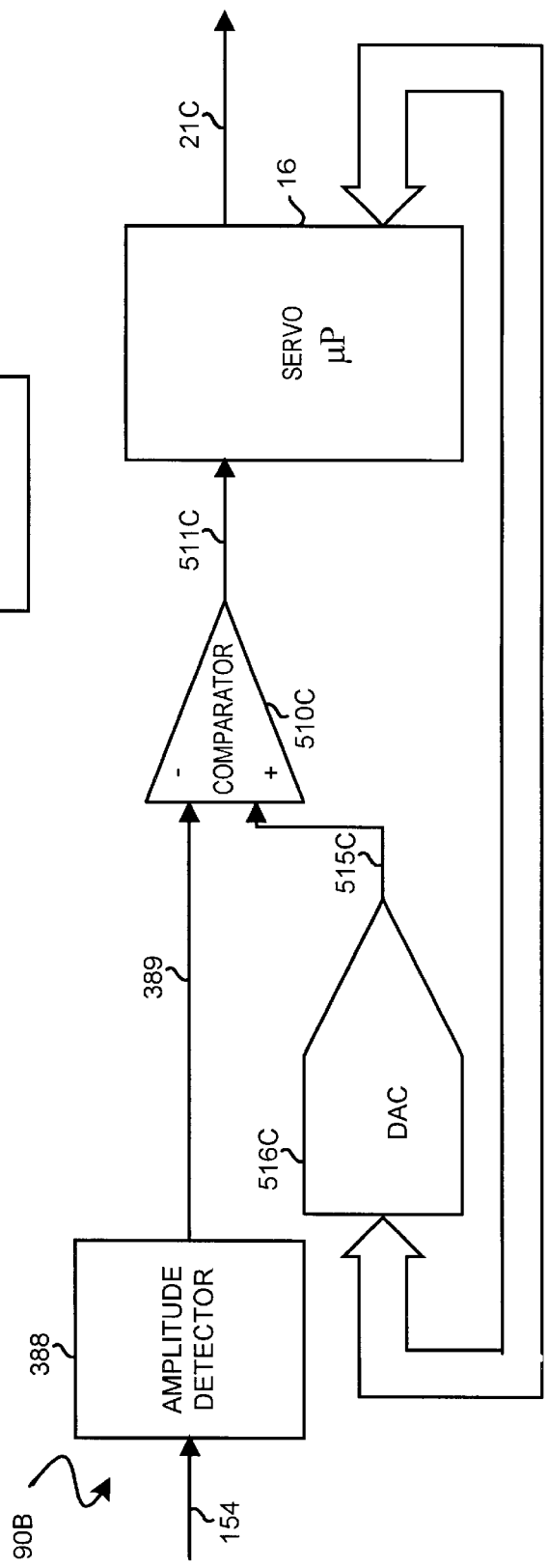

DISK DRIVE HAVING A WRITE CONDITION DETECTOR FOR SUSPENDING WRITE OPERATIONS WHILE A TRANSDUCER FLYING HEIGHT DEVIATES FROM ITS OPERATING FLYING HEIGHT

BACKGROUND OF THE INVENTION

1. Field of the Invention

The present invention relates generally to rotating disk drives and, more particularly, to a disk drive having a write condition detector that generates a write condition signal to indicate that the writing of data in a user data segment during a write operation is unsafe when a fly-height-representing signal exceeds a threshold.

2. Description of the Prior Art

The competitive nature of the disk drive industry encourages rapid technological innovation. One result of this innovation is the advent of the low-flying head. A low-flying head enables an increase in the areal recording density, expressed in bits per square inch, that enables smaller, yet higher capacity, disk drives. Refer now to FIG. 1 which shows a modern low-flying head 10. Head 10 writes data to and reads data from a disk 12. The disk spins in the direction of arrow 4. Head 10 comprises a slider 78 and a transducer 76 constructed in a conventional manner. Head 10 'flies' above the spinning disk 12 on an air bearing created by the relative motion between the disk recording surface 89 and head 10. The part of the head 10 in contact with the air bearing is known as the air bearing surface 86. Head 10 is fixed to a suspension arm (not shown) that can drive the head 10 across the disk recording surface 89 in response to an actuator system. The suspension also exerts a force on head 10 that helps keep the head flying close to the disk recording surface 89. The distance between the air bearing surface 86 and the disk recording surface 89 is known in the industry as fly height 9.

Just a few years ago heads were designed with a positive pressure air bearing across the entire slider. In a positive pressure air bearing, the air bearing surface is designed to create pressure across the surface of the bearing. In comparison to modern heads, these old heads flew relatively high, 2 to 3 microinches, above the spinning disk surface. Modern heads fly much closer to the spinning disk surface, at approximately 1.2 microinches, using a negative pressure zone along a portion of the slider with positive pressure air bearings. The negative pressure zone creates low pressure under part of the head 10 that helps keep the head close to the spinning disk recording surface 89 using the Venturi effect. Typically, the middle portion 84 of the head creates the low pressure zone and the outside portions 83 and 85 of the head create the high pressure air bearings. This is analogous to a modern race car incorporating a 'ground effect' where the wheels support the car off the ground and the body of the car is shaped to create a low pressure zone under the car holding the car to the road. In the analogy, the high pressure air bearings are the wheels, the disk is the road, and the low pressure zone of the slider is the body of the car.

For each combination of disk surface 89 and head 10, there is defined a nominal fly height 82, a high-fly threshold 81 and a low-fly threshold 91. Flying higher than the high-fly threshold 81 or flying lower than the low-fly threshold 91 during normal disk drive operations can lead to data errors or to other consequences, such as a head crash. The high-fly threshold 81 and the low-fly threshold 91 define the operating fly height range of head 10.

Because modern heads fly so close to the spinning disk surface, contaminants or defects in the disk recording surface 89 may cause head 10 to fly high out of the operating fly height range. Contaminants such as particles or debris can become stuck to, and caught under, head 10 and cause the head to fly high. Also extreme temperature and pressure variations may cause the head to fly low.

Head 10 is shown with contaminants 77 stuck to its trailing edge 87. Often contaminants can be smeared along the trailing edge 87 of the air bearing surface on the bottom of a head. The trailing edge 87 of the air bearing surface is the location of the magnetic recording elements.

Currently, the industry has identified certain sources of contamination such as excess fluorocarbon lubrication, hydrocarbons condensed onto the head, carbon from the disk overcoat that has been burnished off, and particulate contamination debris. The industry uses fluorocarbon lubrication to prevent the head from sticking during starts and stops. Hydrocarbons may condense on the head from oil on disk drive parts, adhesives, and grease from disk drive bearings. Disk carbon originates from carbon that has been burnished from the carbon overcoat of the disk by contact with the head. Other sources of contamination and debris are environmental such as dust and smoke particles.

A high or low-flying head can cause many problems in a disk drive. Data errors may be caused by a high-flying head during a write operation, known to those in the industry as a 'high-fly write.' These data errors may be either soft errors that are correctable by the disk drive's error recovery systems, or these data errors may be hard errors that are impossible to correct with the disk drive's error recovery systems. Even though a 'low-fly write' is not considered a source of data errors per se, because the closer the head is to the disk the better the data is written, a low-fly write may nevertheless be an indicator of an impending head crash. In either case, it would be desirable to monitor the condition of the write operation to know when a high-fly write or low-fly write has occurred.

Because modern heads fly relatively close to the disk surface, a high-fly will have a much more dramatic effect on the ability of the head to write the disk. For example, a head that flies nominally at 3 microinches experiences a 1 microinch increase in fly height to 4 microinches due to contaminants sticking to the head. The change in fly height is 33.3% of the nominal fly height. In contrast, if a head that flies nominally at 1.2 microinches experiences the same 1 microinch increase in fly height to 2.2 microinches the change in fly height is now 83.3% of the nominal fly height.

Because old style heads fly relatively high above the disk surface they are relatively more susceptible to crashing into the disk surface. In contrast, very little except extreme pressure and temperature variations can make the modern head fly low. In some relatively rare cases, torsion of the head caused by contaminants asymmetrically affecting the head will cause one side of the head to rise and the other side to fall, resulting in a low-flying head. Generally, with a negative pressure zone head there is little change in fly height with changes in air pressure.

Historically, the art has focused on gauging fly height for the prediction of a head crash during a test at build time or the control of fly height using a head positioning system. As noted above, high-fly writes were not as significant a problem because the head was flying relatively high, as a result high-fly writes and low-fly writes are not addressed by the prior art.

Fundamentally, the art depends on the Wallace equation which expresses the dependence of the readback voltage on various parameters, such as head/disk spacing. In U.S. Pat. No. 4,777,544 to Brown et al., a system is described that computes the head/disk spacing by first recording a periodic signal on the disk at a predetermined location in a data track and measuring the readback signal at a first velocity and then again at zero velocity. In addition, a measure of relative change in head/disk spacing is obtained by the "Harmonic Ratio Flyheight" (HRF) method. One of the drawbacks of this system is that a portion of the disk surface is occupied by the periodic signal, thus reducing the effective user data storage capacity. Brown et al. do not address the problem of high-fly writes or low-fly writes.

One system that utilizes the HRF method of U.S. Pat. No. 4,777,544 is described in U.S. Pat. No. 5,377,058 to Good et al. This system dynamically adjusts the fly height of a head using a piezoelectric element. One drawback of this system is a dependence on a dedicated fly height signal to control the head fly height and the attendant reduction in user data storage space in a data track. Like Brown et al, Good et al. do not address the problem of high-fly writes or low-fly writes. Good et al. also has the additional drawback that head positioning only occurs during a read operation because the head reads the periodic signal from the data track as an integral part of the control system. Good et al. can not effectively control the head position during a write operation because the control system is blinded during the write operation. In other words, Good et al. would be just as detrimentally affected by a high-fly write or a low-fly write as any other system of the prior art.

U.S. Pat. No. 5,410,439 to Egbert et al. describes a system that uses the HRF method described above to predict a head crash. As with the other systems this system has the disadvantage of dedicating a portion of the hard disk storage space for the dedicated signal. Like Brown et al. and Good et al., Egbert et al. do not address the problem of high-fly writes or low-fly writes. Egbert et al. also has the additional drawback that for most of the predictive tests the disk velocity must be spun down to zero in order to make predictive measurements, making the tests unsuitable for use during normal write operations.

Accordingly, there is a need for a disk drive that reduces the detrimental effects of a high-fly write or a low-fly write in a user data segment.

SUMMARY OF THE INVENTION

The invention may be regarded as a disk drive having a head and a recording surface, wherein the recording surface includes a track having a user data segment and a periodic reference segment. The head flies above the recording surface at a fly height that varies as the head flies. During a write operation the head writes data in the user data segment. During the write operation the head produces a reference signal when reading the periodic reference segment. The disk drive has a means, responsive to the reference signal, for detecting fly-height varying components of the reference signal. The disk drive has a means for providing a threshold, wherein the threshold represents a fly height threshold for the head. The disk drive further has a means, responsive to the fly-height varying components of the reference signal and responsive to the threshold, for generating a write condition signal that indicates that writing of data in the user data segment during the write operation is unsafe.

The invention may also be regarded as an integrated circuit for use in a disk drive having a head and a recording surface. The recording surface includes a track having a user data segment and a periodic reference segment. The head flies above the recording surface at a fly height that varies as the head flies. During a write operation the head writes data in the user data segment. During the write operation the head produces a reference signal when reading the periodic reference segment. The integrated circuit has a means, responsive to the reference signal, for detecting fly-height varying components of the reference signal. The integrated circuit has a means for providing a threshold, wherein the threshold represents a fly height threshold for the head. Further, the integrated circuit has a means, responsive to the fly-height varying components of the reference signal and responsive to the threshold, for generating a write condition signal that indicates that writing of data in the user data segment during the write operation is unsafe.

The invention may also be regarded as method for generating a write condition signal for use in a disk drive having a head and a recording surface. The recording surface includes a track having a user data segment and a periodic reference segment. The head flies above the recording surface at a fly height that varies as the head flies. During a write operation the head writes data in the user data segment. During the write operation the head produces a reference signal when reading the periodic reference segment. The method includes detecting fly-height varying components of the reference signal. The method includes providing a threshold, wherein the threshold represents a fly height threshold for the head. The method further includes generating a write condition signal that indicates that writing of data in the user data segment during the write operation is unsafe.

BRIEF DESCRIPTION OF THE DRAWINGS

FIGS. 13A and 13B show an alternate embodiment of the amplitude and threshold detector 90 in the write condition detector of FIG. 12.

DESCRIPTION OF THE PREFERRED EMBODIMENTS

Figure 1:
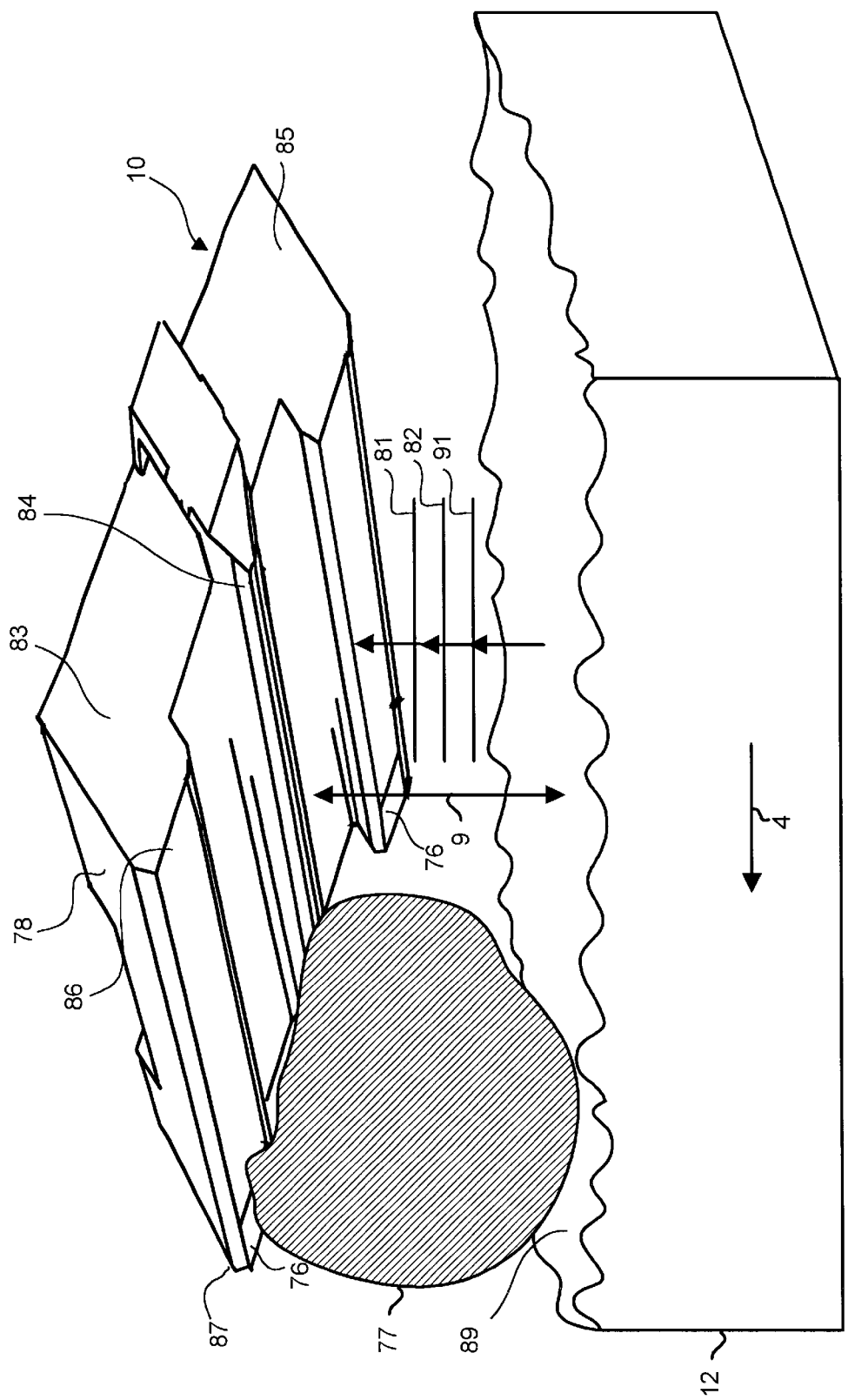
FIG. 1 shows a head with contaminants stuck to the head, wherein the head is flying above the surface of a disk at a fly height that exceeds a high-fly threshold value due to either contact with the contaminants or disk surface anomalies.
Figure 2:
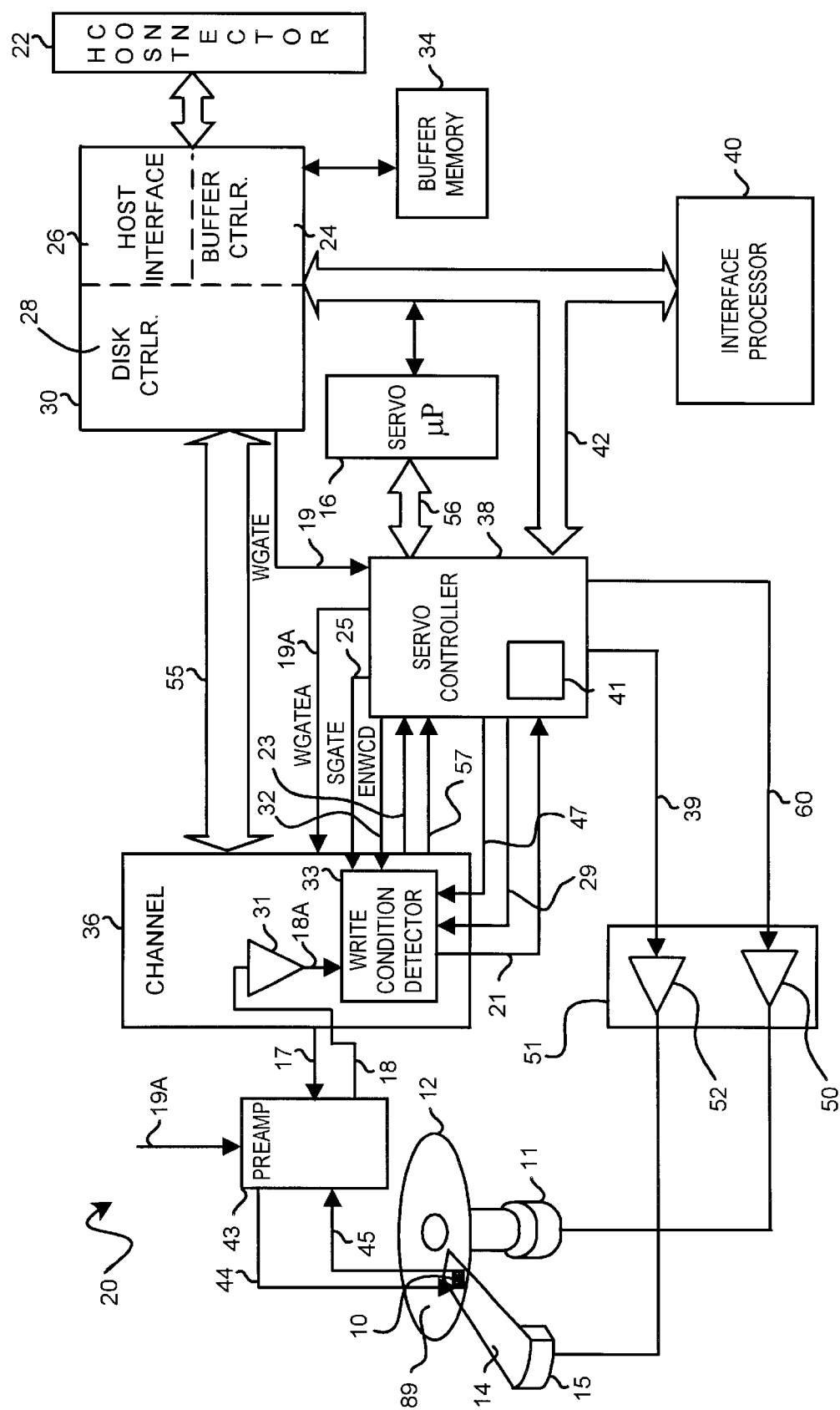
FIG. 2 is a block diagram of a disk drive embodying the invention including a disk having a track that includes a user data segment and a periodic reference segment, a head flying above the disk to write data in the user data segment and produce a reference signal while reading the periodic reference segment, and a write condition detector for generating a write condition signal that indicates that writing of data in the user data segment is unsafe when a fly-height-representing signal exceeds a threshold value.

Referring to FIG. 2, a disk drive 20 embodying the invention includes a disk 12 having a recording surface 89, a spindle motor 11 that causes disk 12 to rotate at a substantially constant angular velocity, an actuator assembly including an actuator motor 15 and an actuator/suspension assembly 14, a head 10 connected to actuator/suspension assembly 14, and a preamplifier 43.

Disk drive 20 further includes a host connector 22, a host interface and disk controller ("HIDC 30"), a buffer memory 34, an interface processor 40, a servo controller 38, a servo microprocessor 16, a read/write channel ("channel 36"), and a power driver 51. HIDC 30 includes a buffer controller 24, a host interface controller 26, and a disk controller 28. Channel 36 includes an automatic gain control circuit ("AGC 31") and a write condition detector 33. Servo controller 38 includes a write condition register 41.

When disk 12 rotates, the relative motion between head 10 and disk 12 creates an aerodynamic force that lifts head 10 above recording surface 89 of disk 12. Head 10 is said to 'fly' over disk 12. Actuator/suspension assembly 14 supports head 10, and as driven by actuator motor 15, positions head 10 to selected radial positions relative to recording surface 89 of disk 12. Actuator/suspension assembly 14 also provides a downward force, defined as toward recording surface 89, to keep head 10 close to recording surface 89 of disk 12.

Head 10 flies at a nominal flying height that defines an operating flying height. The operating flying height ranges above and below the nominal flying height. During a write operation, if head 10 deviates about 40% above the nominal flying height, head 10 is considered to be flying at an unsafe high-flying height and the data written on recording surface 98 may be unreliable. If head 10 deviates about 50% below the nominal flying height, head 10 is considered to be flying at an unsafe low-flying height and may be about to contact recording surface 89. A high-fly threshold value defines the boundary of an unsafe high-flying height. A low-fly threshold value defines the boundary of an unsafe low-flying height.

Disk drive 20 is electrically connected to a host computer (not shown) by host connector 22. The host computer sends commands to disk drive 20 such as read commands, write commands, and control information through a host bus (not shown) attached to the host computer. Host connector 22 is connected to HIDC 30. Host interface controller 26 processes data and control signals received from the host computer and performs command decoding and status functions. Host interface controller 26 notifies interface processor 40 through an interface processor bus (IP bus 42) that commands have been received from the host computer. Host interface controller 26 also handles data transfers between a host bus and buffer memory 34 with the aid of buffer controller 24. The interface may conform to the Small Computer System Interface standard (SCSI), IDE, 1394 Fire Wire, Fiber Channel or the SSA bus standard or other suitable interface standard.

Buffer controller 24 reads and writes data in buffer memory 34. Buffer memory 34 may store data received from the host computer during a host write operation, or may store data received from disk 12 during a disk read operation.

Channel 36 is connected to receive and transmit data to head 10 via preamplifier 43 via write data line 17 and read data line 18. Channel 36 includes a write channel, and a read channel with AGC 31 and write condition detector 33. Channel 36 is also connected to disk controller 28 via data transfer bus 55 and to servo controller 38 as discussed below. Beneficially, channel 36 includes write condition detector 33, discussed in more detail below, which allows for detection of a high-flying head to provide a warning via a write condition signal 21 connected to servo controller 38 that a write operation may provide marginally recoverable data on disk 12.

Interface processor 40 provides for priority interrupt requests as well as command, status and data transfers to and from disk controller 28 and servo controller 38 on IP bus 42. Interface processor 40 commands disk controller 28 to perform read and write operations in response to commands from the host.

Disk controller 28 encodes and decodes data written to and read from disk 12. Disk controller 28 also provides error detection code (EDC) and error correction code (ECC) functions. These functions allow for the detection and correction of data errors during read operations. These functions calculate and append redundancy codes to data written to disk 12.

Servo controller 38 receives a digital track ID from channel 36 on TID line 23, and servo data on servo data line 57. Servo controller 38 receives servo burst, and ID field information when embedded servo segments containing servo fields move under head 10. Servo controller 38 also includes conventional timing and demodulating circuitry and phase lock loop (PLL) circuitry. Servo controller 38 provides a servo gate signal 25 (SGATE) to channel 36, detects servo sync marks, and demodulates servo information from a servo segment on disk 12.

Servo controller 38 receives commands and data from, and provides priority interrupts to, interface processor 40. Servo controller 38 is connected to a servo processor 16 through servo bus 56. Servo processor 16 maintains the position of head 10 over disk 12 and the speed of spindle motor 11 by a combination of firmware program execution and servo control logic in servo controller 38. Servo controller 38 provides an actuator control signal 39 to actuator power driver 52 and a spindle motor control signal 60 to spindle motor power driver 50. Servo controller 38 controls the voice coil of actuator motor 15, that moves actuator/suspension assembly 14, through power driver 52 in a conventional manner. Servo controller 38 controls spindle motor 11 through spindle motor power driver 50 also in a conventional manner.

Figure 3:
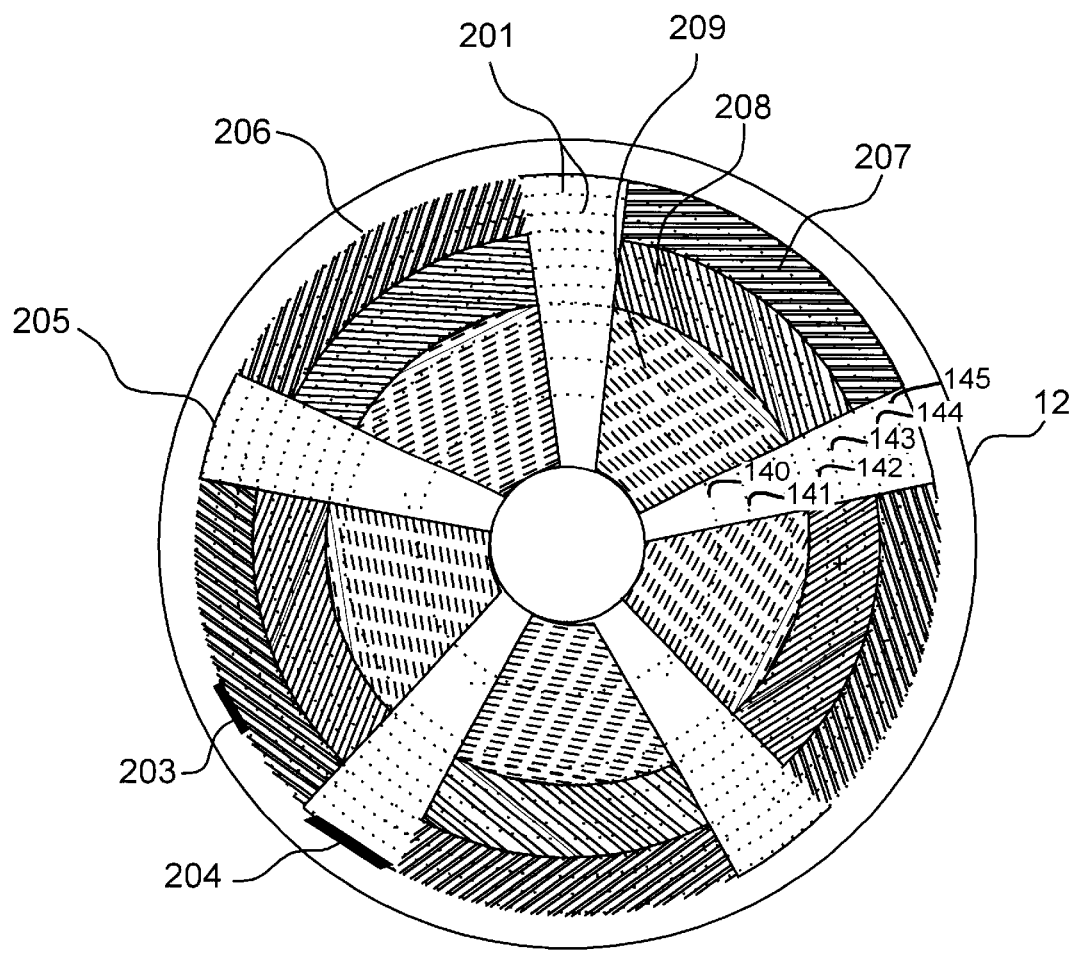
FIG. 3 shows a schematic view of the disk of FIG. 2 having multiple zones that each include a plurality of tracks having servo segments and user data segments.

FIG. 3 is a view of recording surface 89 of disk 12. Disk 12 is coated with magnetic recording media in which is recorded magnetic flux reversals representing information including user data and servo data. The servo data includes periodic reference data.

Recording surface 89 comprises a number of concentric tracks 201. Digital information, such as user data and servo data, are stored upon tracks 201 in the form of either a user data segment (sector) 203 or a servo data segment (sector) 204. There are a number of user data segments 203 between servo segments 204 on tracks 201. Also, there are a number of servo segments 204 per track that are spaced apart at regular intervals forming "servo wedges" 205. Likewise, there are a number of user data segments 203 per track that form "user data wedges" 206. Furthermore, tracks 201 are grouped into multiple zones 207, 208, 209, that have data recorded at different frequencies according to zone bit recording methods, as is well known in the art. For example, multiple zones 207, 208, and 209 can be defined to be 16 user data zones and 8 servo zones.

For each zone on recording surface 89, a number of test tracks are designated for computing high-fly and low-fly threshold zone coefficients of disk drive 20. For example, for zone 209 test tracks 140 and 141 are identified. For zone 208 test tracks 142 and 143 are identified. For zone 207 test tracks 144 and 145 are identified. These tracks are chosen at the beginning and end of each zone and define which tracks will be used to determine zone coefficients during manufacturing of disk drive 20. The zone coefficients are used in a linear or higher order approximation of the high-fly threshold or low-fly threshold value that is a function of track number for each head/disk combination in disk drive 20. The zone coefficients may be created for either the user data zones or the servo zones or another number of zones unrelated to the number of user data zones or servo zones.

A process for computing zone coefficients for disk drive 20 is discussed below. A process for computing a high-fly threshold based on the zone coefficients during normal operations of disk drive 20 is also discussed below.

Figure 4:
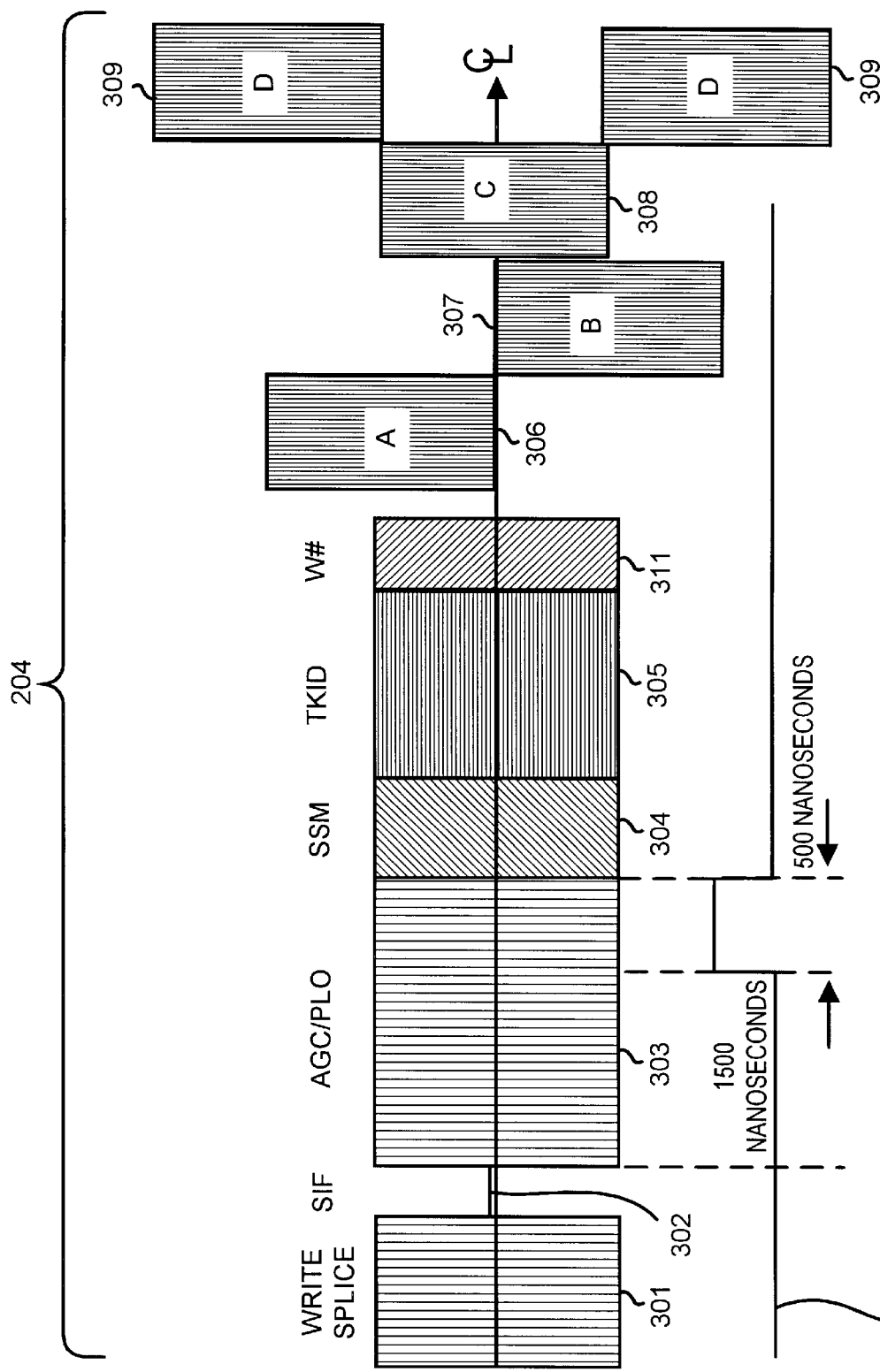
FIG. 4 shows components of the servo segment of FIG. 3 including a periodic reference segment.

FIG. 4 illustrates an example of servo sector 204. The various components of servo sector 204 are not drawn to scale. Servo sector 204 comprises a sequence of fields having various functions useful during servo processing and write condition detection.

Write splice or setup field 301 provides a buffer zone following a preceding user data segment which is written to prevent an erasure being erroneously detected as a servo initialization field. The servo initialization field SIF 302 provides a uniquely modulated segment that allows for detection of a servo segment. Typically SIF 302 is created by a dc erase of the segment. The SIF field 302 provides a pattern that the disk drive uses in its synchronous detection efforts when trying to lock on to the servo data.

AGC/PLO field 303 provides a stable reference to set the gain of the channel and "train" a phase lock oscillator to lock on the servo channel frequency. Suitably, the AGC/PLO field 303 is a periodic reference segment that can be used for generating reference signal 18 and providing fly-height varying components of reference signal 18 for characterizing the flying-height of head 10.

Servo sync mark SSM 304 field provides a uniquely coded word that synchronizes decoding logic to byte or word timing boundaries. Track identification field TKID 305 provides a coded binary address of the track. Conventionally a gray code is employed to allow for reading track identification fields during seek operations.

W# field 311 identifies the sequence number of each wedge in the sequence of wedges spaced around the track. Servo burst fields "A–D" 306–309 are used to indicate the position of head 10 with respect to the track center. These servo bursts "A–D" are used in track following modes to precisely position the head over a track. In an alternate embodiment of the invention, one or more of servo bursts 306–309 serve as a periodic reference segment.

During a write operation, disk controller 28 asserts write gate signal WGATE 19 to enable writing of data on disk 12. Servo controller 38 receives WGATE 19 and provides logic to conditionally assert a write gate signal 19A (WGATEA) to channel 36 and preamplifier 43. The conditional logic in servo controller 38 permits servo processor 16 to disable writing if, for example, an out of range head position is detected when processing a servo sector.

During the write operation, servo controller 38 asserts servo gate signal 25 and head 10 generates read signal 41 while reading the periodic reference segment (for example AGC/PLO 303 of FIG. 4) in servo sector 204. Preamplifier 43 receives read signal 45 and generates reference signal 18. AGC 31 receives reference signal 18 and generates reference signal 18A. AGC 31 works by biasing an AGC amplifier in a well known manner. AGC 31 is an amplifier/filter circuit that is used to control the shape, amplitude, and form of the pulses of reference signal 18A by varying the low pass cutoff frequency and high frequency boost associated with AGC 31. AGC 31 provides variable gain to hold reference signal 18a to a predetermined voltage level.

The flying height of head 10 can characterized by the pulse width (PW50) of reference signal 18A, as discussed below. Suitably, the PW50 is characterized by an area:peak ratio of reference signal 18A. Alternatively, the PW50 can be characterized by other fly-height varying components of reference signal 18A. For example, according to an alternate embodiment, the PW50 can be characterized by fundamental and higher harmonic frequency components of reference signal 18A.

As head 10 deviates above the nominal flying height, the pulse width widens, the area increases, and the peak remains constant due to AGC 31 maintaining a substantially constant amplitude. As head 10 deviates below the nominal flying height, the pulse width narrows, the area decreases, and the peak remains constant due AGC 31 maintaining a substantially constant amplitude. Therefore, as head 10 flies higher, the area:peak ratio increases. As head 10 flies lower, the area:peak ratio decreases.

Suitably, a high-fly threshold value is defined by a high-fly area:peak threshold ratio that is equal to about 1.4× nominal area:peak ratio, wherein the nominal area:peak ratio is an area:peak ratio for reference signal 18A generated by head 10 flying at a nominal flying height. A low-fly threshold value is defined by a low-fly area:peak threshold ratio that is equal to about 0.5× nominal area to peak ratio.

Suitably, the high-fly threshold value can be factored into an area component of reference signal 18A to generate a scaled area component. The scaled area component is compared to a peak component of reference signal 18A to determine if head 10 has deviated from its operating flying height to an unsafe high-flying height. This corresponds to comparing the area:peak ratio of reference signal 18A to the high-fly area:peak threshold ratio. Alternatively, the area-:peak ratio for reference signal 18A is compared to the high-fly threshold value to determine if head 10 has deviated from its operating flying height to an unsafe high-flying height.

During the write operation, servo controller 38 asserts ENWCD signal 32 and provides a high-fly threshold value to write condition detector 33 on a serial communication line 29. Servo controller 38 receives write condition signal 21 from channel 36 and modifies a register 41 to reflect the status of write condition signal 21 at the conclusion of each servo sector.

Write condition detector 33 receives reference signal 18A from AGC 31, and the high-fly threshold value via serial communication line 29 from servo controller 38. When ENWCD signal 32 is asserted, write condition detector 33 starts processing reference signal 18A to detect the fly-height vary components of reference signal 18A. Suitably, write condition detector 33 detects the area and peak components of reference signal 18A. In response to the fly-height varying components and the high-fly threshold value, write condition detector 33 asserts write condition signal 21 when the flying height of transducer 10 deviates from its operating flying height to an unsafe high-flying height. Write condition detector 33 provides write condition signal 21 to servo controller 38. At the falling edge of SGATE signal 25, servo controller 38 monitors (polls) write condition signal 21 to determine whether to register a high-fly write condition in write condition register 41.

Write condition register 41 is read by interface processor 40 after the conclusion of servo processing by servo processor 16. Alternatively, servo controller 38 can generate a priority interrupt for interface processor 40.

If write condition register 41 indicates the high-fly write condition, interface processor 40 will command disk controller 28 to stop the writing of data in the user data segment during the write operation. Disk controller 28 then de-asserts write gate signal 19, and servo controller 38 de-asserts write gate signal 19A.

If write condition signal 21 is asserted and interface processor 40 commands disk controller 28 to stop the writing of data during the write operation, the write portion of preamplifier 43 is disabled and disk drive 20 enters a diagnostic mode. Alternatively, read and verify operations can be performed prior to diagnostics. Often a high-fly write will actually succeed in writing data in a user data segment. The read-verify operation may be employed to verify a potentially successful write operation. In this alternate embodiment, write condition signal 21 does not prematurely terminate the writing of user data during the write operation but enters a read-verify operation after writing the user data during the write operation.

Figure 5:
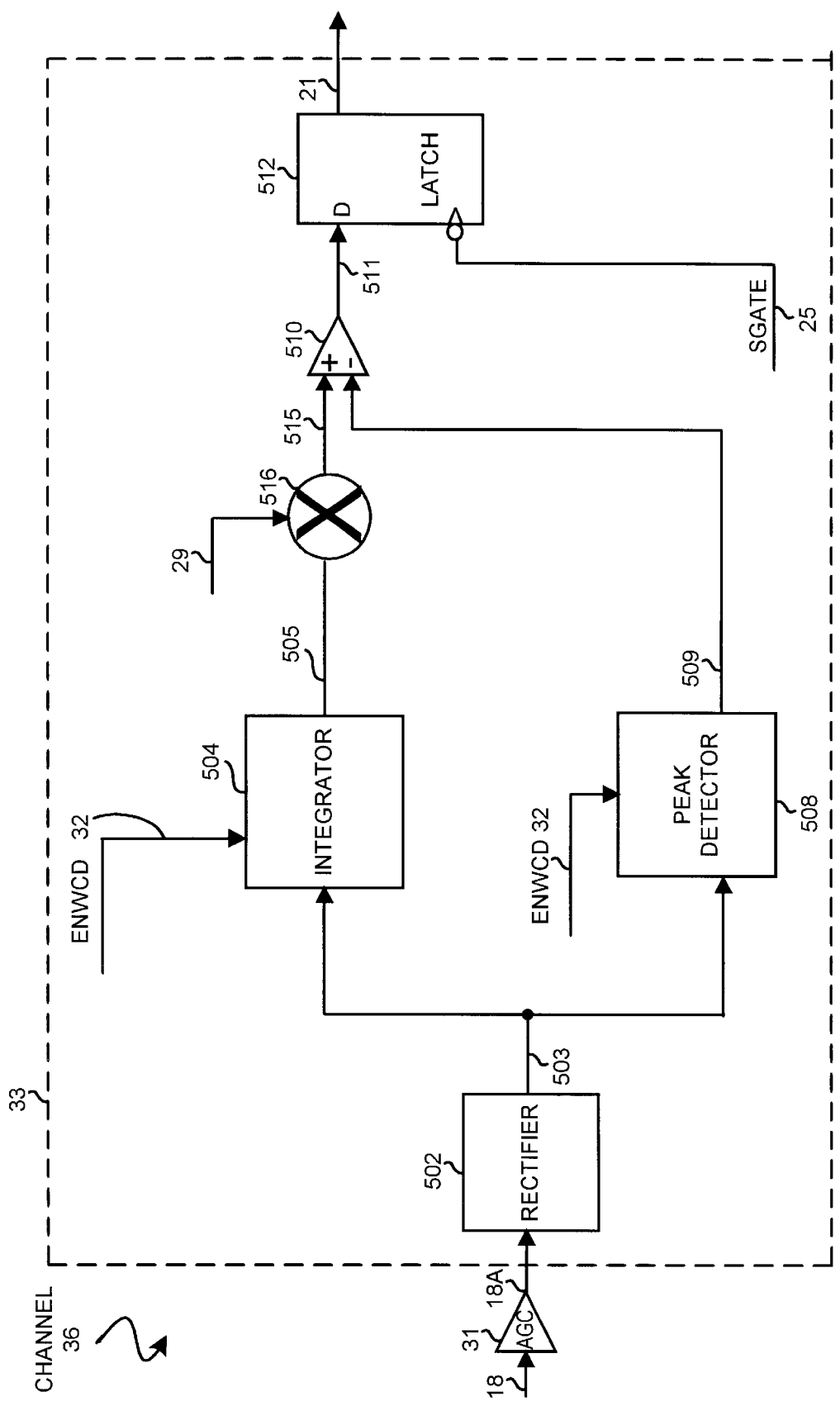
FIG. 5 shows a block diagram of the write condition detector in the disk drive of FIG. 2 employing area and peak detection.
Figure 6A:
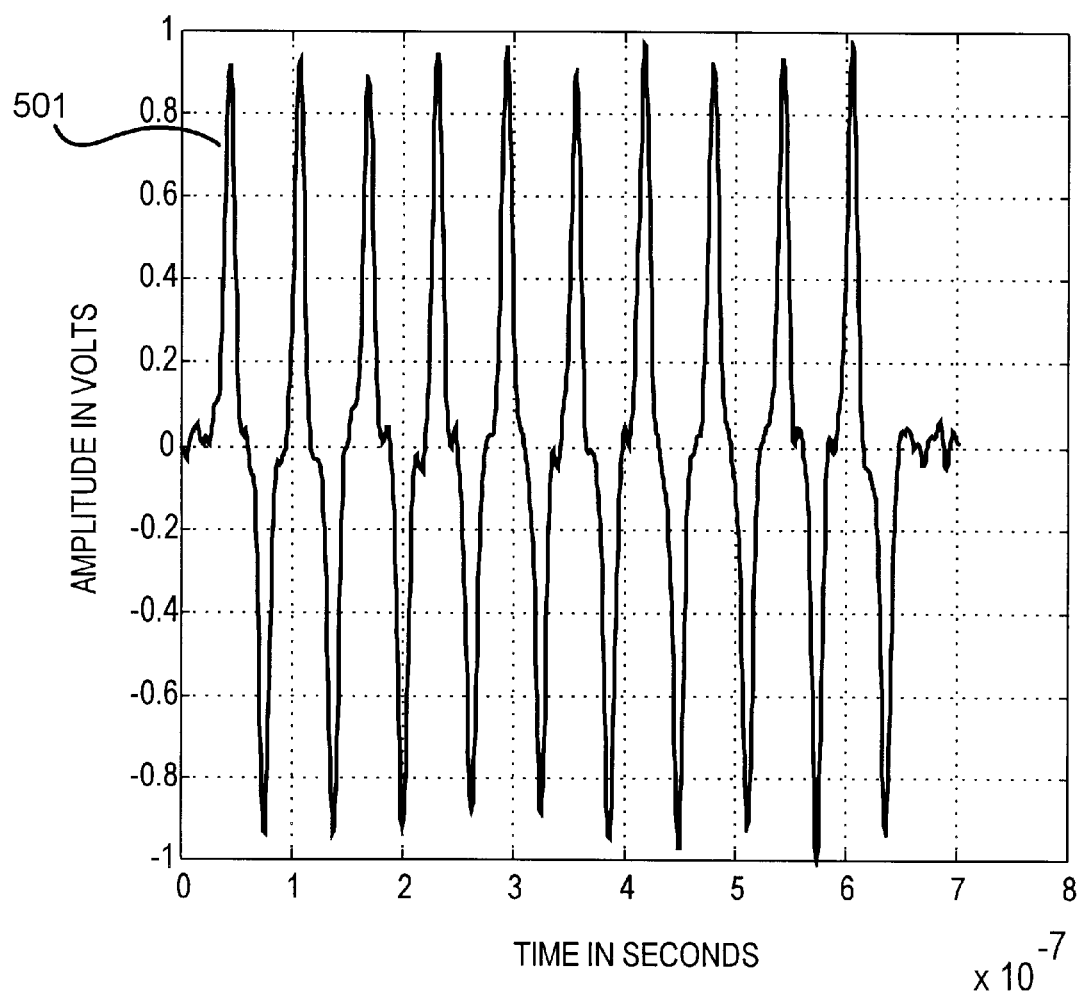
FIGS. 6A–6C show exemplary signals generated within the write condition detector of FIG. 5.
Figure 6B:
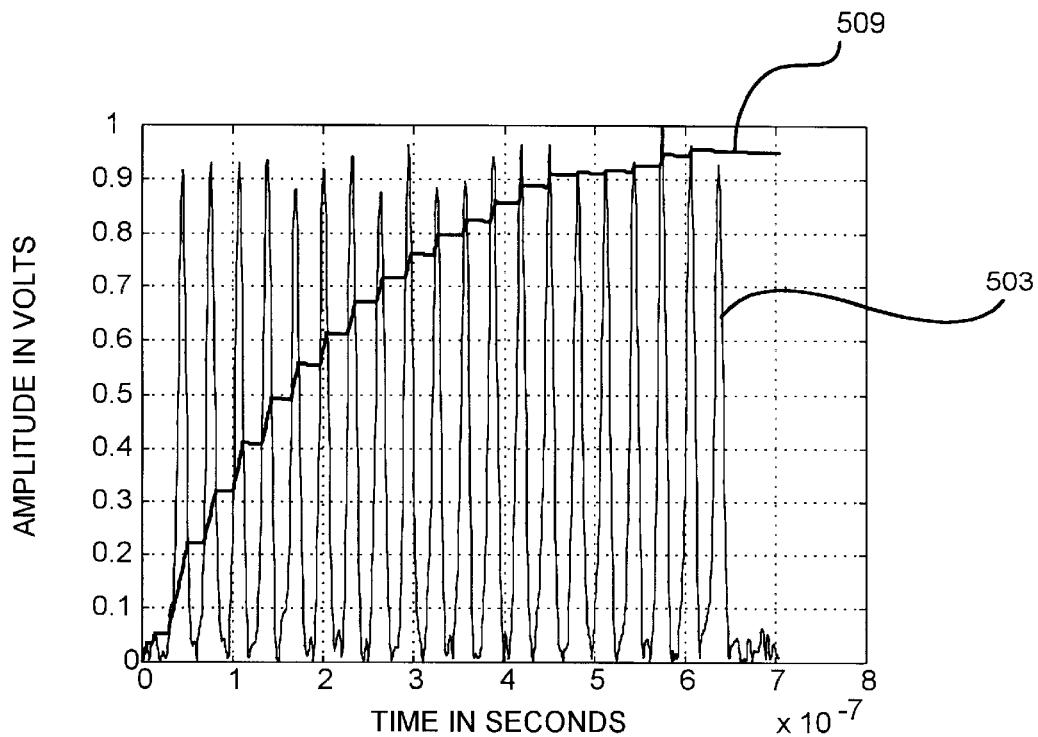
Figure 6C:
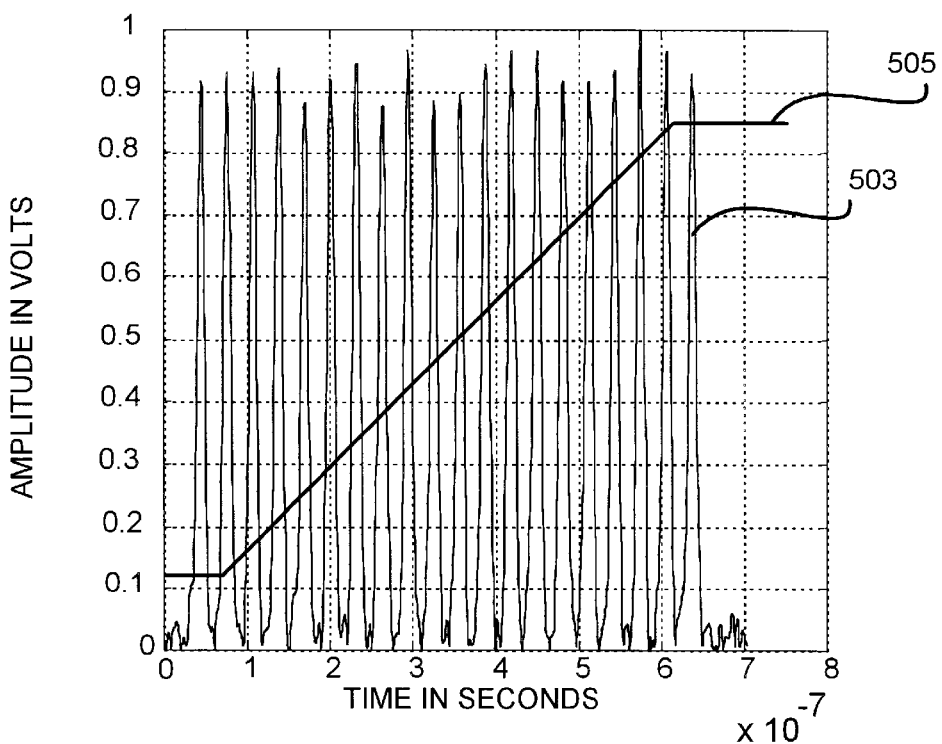

Referring to FIG. 5, write condition detector 33 includes a rectifier 502, a peak detector 508, a comparator 510, a multiplying DAC 516, and a latch 512. Full wave rectifier 502 receives reference signal 18A and generates a rectified reference signal 503. FIG. 6A is a waveform of reference signal 18A as head 10 reads the periodic reference segment from AGC/PLO field 303. FIG. 6C shows a waveform of rectified reference signal 503 having an approximate 0.0 to 1.0 volt peak to peak voltage variation.

Rectified reference signal 503 is provided to integrator 504 and peak detector 508. The function of integrator 504 is to measure area under the pulse of rectified reference signal 503 for use in generating write condition signal 21. As AGC 31 maintains a substantially constant amplitude of signal 18A, the pulse width or PW50 of reference signal 18A will be wider with a higher flying head 10 so the area under the pulse will be greater with a higher flying head 10.

Integrator 504 and peak detector 508 are enabled by ENWCD signal 32 from servo controller 38 so that write condition detector 33 starts monitoring the flying height of head 10. ENWCD signal 32 is also shown in FIG. 4 as it relates to the periodic reference segment in servo sector 204. Suitably, write condition detector 33 starts monitoring the AGC/PLO 303 signal during a final portion which may suitably be 25% of the AGC/PLO field 303 before processing the fly-height varying components.

For example, the duration of AGC/PLO field 303 is 2000 nanoseconds, as a result the timer would wait 1500 nanoseconds before servo controller 38 asserts ENWCD signal 32. Integrator 504 begins to integrate rectified signal 503 when enabled by ENWCD signal 32. A second timer in servo controller 38 would then wait the remaining 500 nanoseconds before servo controller 38 deasserts ENWCD signal 32.

While ENWCD 32 is asserted, integrator 504 integrates rectified reference signal 503 and generates an area reference signal 505. Peak detector 508 detects the peak of reference signal 503 and generates a peak reference signal 509. Integrator 504 integrates rectified reference signal 503 from 0.0 to 0.85 volts with a final integrated value of 0.85 volts. FIG. 6C also shows a waveform of area reference signal 505.

Peak reference signal 509 is a slow moving DC signal representing the peak amplitude of rectified reference signal 503. Peak detector 508 is a conventional differential peak detector which provides peak reference signal 509. Alternatively, peak detector 508 is a conventional envelope detector. FIG. 6B illustrates the peak reference signal 509 of rectified reference signal 503 according to this alternate embodiment.

Multiplying DAC 516 receives area reference signal 505 from integrator 504 and a digital high-fly threshold value via serial communication line 29 from servo controller 38. The digital high-fly threshold value is a programmable threshold coefficient that is computed by servo processor 16 and provided to servo controller 38 from servo controller 38. Multiplying DAC 516 combines area reference signal 505 and the high-fly threshold value to generate a combined area reference/high-fly threshold signal 515 (scaled area reference signal 515).

Combined area reference/high-fly threshold signal 515 is provided to analog comparator 510 and compared to peak reference signal 509. If combined area reference/high-fly threshold signal 515 has a voltage level that exceeds the voltage level for peak reference signal 509, than the output of comparator 510 is true, indicating that head 10 has deviated from its operating flying height to an unsafe high-flying height. The output of comparator 510 is a high-fly write condition signal 511. High-fly write condition signal 511 is latched at the falling edge of servo gate signal 25 by latch 512. The output of latch 512 is write condition signal 21 that is provided to servo controller 38.

Alternatively, write condition detector 33 includes a divider (not shown) that divides area reference signal 505 by peak reference signal 509 to generate a fly-height-representing signal that represents a ratio of area reference signal 505 to peak reference signal 509 ("computed area to peak ratio"). Write condition detector 33 receives a high-fly threshold value representing a high-fly area to peak threshold ratio. If the computed area to peak ratio is above the high-fly area to peak threshold ratio, write condition detector 33 asserts write condition signal 21 indicating that head 10 has deviated from its operating flying height to an unsafe high-flying height.

Write condition detector 33 of FIG. 5 may be realized separately in a stand alone integrated circuit or may be realized as a component of an integrated circuit, such as a component of channel 36. Implementing write condition detector 33 in hardware reduces the firmware processing load on the servo processor 16 and interface processor 40.

Figure 7:
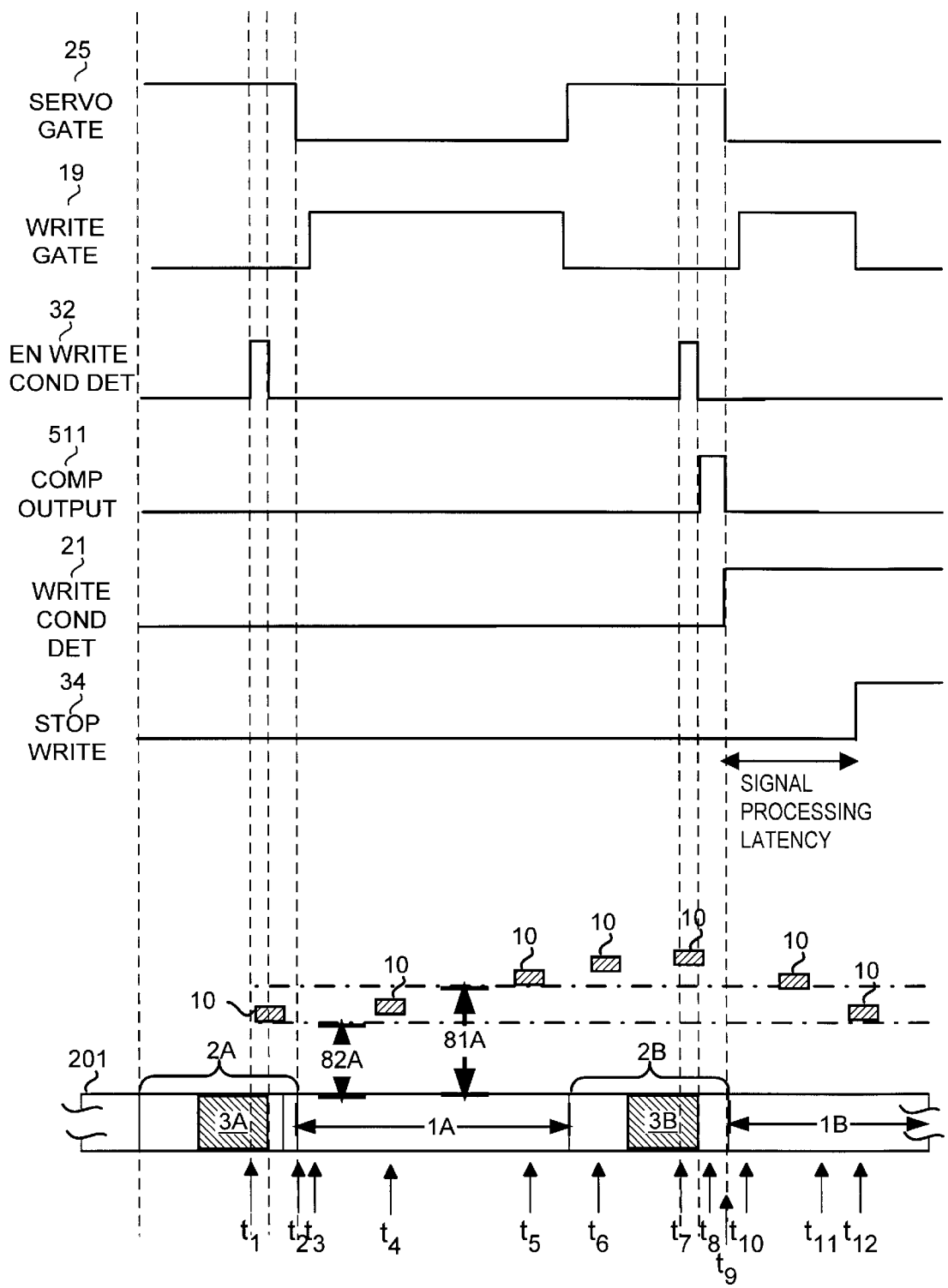
FIG. 7 shows the flight path of a head flying over a disk during a write operation illustrating the relative timing relationship between the detection of an unsafe flying height and the write operation using the write condition detector of FIG. 5.

FIG. 7 shows the timing relationship between the detection of a high-fly condition, i.e. write condition signal 21 is asserted, and the occurrence of a write operation while head 10 is in various stages of an example flight path over a track 201 on disk 12 of FIG. 3. The example flight begins over a first periodic reference segment 3A which is suitably the AGC/PLO field 303 of a servo sector 204 represented by 2A and 2B. Head 10 is shown initially flying at a nominal fly height 82A.

Write condition detector 33 starts processing reference signal 18A at time t1 when enable write condition detect signal ENWCD 32 is asserted. During the reading of servo sector 2A and including time t1 until t2, servo gate signal SGATE 25 is true. At the falling edge of servo gate 25, comparator output 511 is sampled in write condition detector 33. Because head 10 is flying at a "safe" height, comparator output 511 is false and therefore the latched signal, write condition 21, remains false indicating that writing is safe and that the upcoming write operation does not need to be interrupted.

At t3, write gate signal WGATE 19 is asserted and the writing of user data commences in user data segment 1A. At t4, contaminants become stuck to the bottom of head 10. At t5, head 10 flies above high-fly threshold 81A set at 150% of the nominal fly height computed for track 201. The write operation proceeds uninterrupted.

At t6, head 10 flies above second periodic reference segment 3B, which is AGC/PLO field 303 of servo sector 2B. At t7, head 10 is flying high. Write condition detector 33 begins to process reference signal 18A at t7 when ENWCD signal 32 is again asserted.

At t8, comparator output 511 is true, indicating that head 10 flying height has deviated from its operating flying height. For example, comparator output 511 is true if scaled area reference/high-fly threshold signal 515 being monitored in write condition detector 33 has exceeded peak reference signal 509.

At t9, the comparator output signal 511 is latched by the falling edge of servo gate signal 25, causing write condition signal 21 to be asserted. Servo controller 38 registers write condition signal 21 in write condition register 41 indicating a high-fly write condition. At t10, disk controller 28 once again asserts write gate signal 19 to continue writing user data. At the conclusion of processing servo sector 2B, servo processor 16 recognizes that the write condition detect bit in register 41 is true. Servo processor 16 causes interface processor 40 to be interrupted by servo controller 38 to indicate that servo sector processing is complete at t11. At t12, interface processor 40 recognizes that head 10 was flying high and sends a stop write command, indicated by stop write signal 34, to disk controller 28 causing write gate signal WGATE 19 to be de-asserted and suspending the write operation until recovery procedures can be implemented. The delay between the assertion of write condition signal 21 and the response of interface processor 40 to provide the stop write command 34 is shown by the arrow labeled "Signal Processing Latency."

Head 10 may return to an operating fly height and pass over the next periodic reference segment at an operating fly height. Or head 10 may continue to fly above a high-fly threshold. In either case, the write operation for user data segment 1A may have to be either verified or verified and rewritten and the write operation for user data segment 1B may have to be retried.

Those skilled in the art will recognize that more or less time may be needed to process write condition signal 21 depending on system architecture and component speed. Even though it is not critical that the write operation be canceled immediately, and may not be required if the write operation is deemed safe, with faster signal processing or a slight change in system architecture the write operation may be prevented from starting altogether. For example, write condition signal 21 may also be directly connected to disable preamplifier 43 or directly connected to interface processor 40 or disk controller 30, or any combination thereof.

During a recovery phase, in addition to the aforementioned verification and retry procedures, interface processor 40 may direct servo processor 16 to implement a seek away to attempt to dislodge contaminants from the head. In a seek away the head is moved away from the current track to a distant track and back again.

Figure 8:
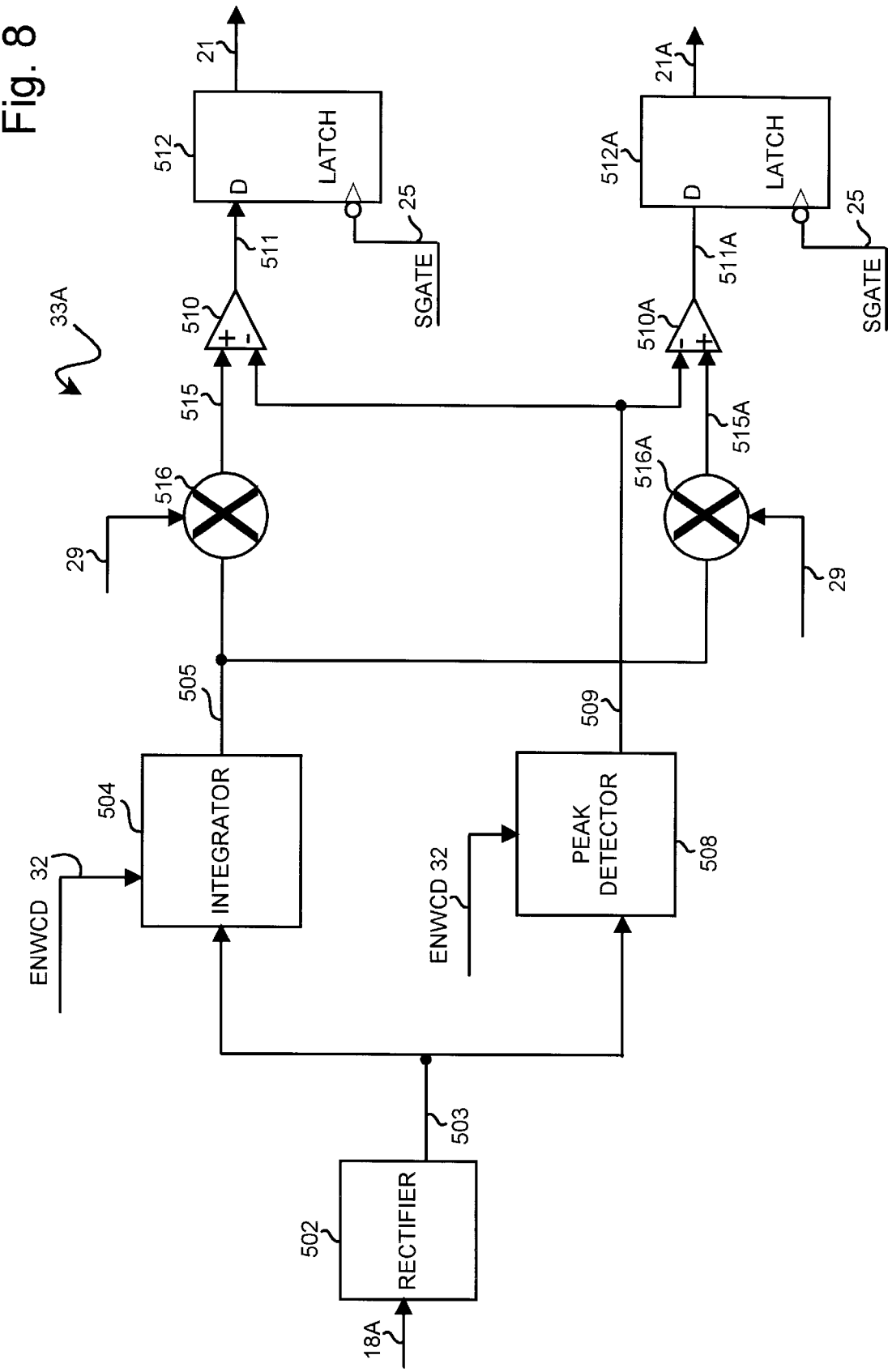
FIG. 8 shows an alternate embodiment of the write condition detector of FIG. 5, where the write condition detector generates a first write condition signal indicating a high-flying head when the fly-height-representing signal is above a first threshold value and generates a second write condition signal indicating a low-flying head when the fly-height-representing signal is below a second threshold value.

Referring to FIG. 8, write condition detector 33A is an alternate embodiment of write condition detector 33 in disk drive 20 of FIG. 2. Write condition detector 33A receives reference signal 18A and generates write condition signal 21 for head 10 flying above the high-fly threshold value, and a write condition signal 21A for head 10 flying below the low-fly threshold value. Write condition detector 33A is identical to write condition detector 33 of FIG. 5 with the additional circuitry to compute write condition signal 21A for head 10 flying below the low-fly threshold value.

Multiplying DAC 516A receives area reference signal 505 from integrator 504 and a digital low-fly threshold value via serial communication line 29 from servo controller 38. The digital low-fly threshold value is a programmable threshold coefficient that is computed by servo processor 16 and provided to servo controller 38. Multiplying DAC 516A combines area reference signal 505 and the low-fly threshold value to generate a combined area reference/low-fly threshold signal 515A.

Combined area reference/low fly-threshold signal 515A is provided to analog comparator 510A and compared to peak reference signal 509. If combined area reference/low-fly threshold signal 515A has a voltage level that exceeds the voltage level for peak reference signal 509, then the output of comparator 510A is true, indicating that head 10 has deviated from its operating flying height to an unsafe low-flying height. The output of comparator 510A is a low-fly write indication signal 511A. Low-fly write indication signal 511A is registered by latch 512A. The output of latch 512A is write condition signal 21A that is transmitted to servo controller 38.

Figure 9:
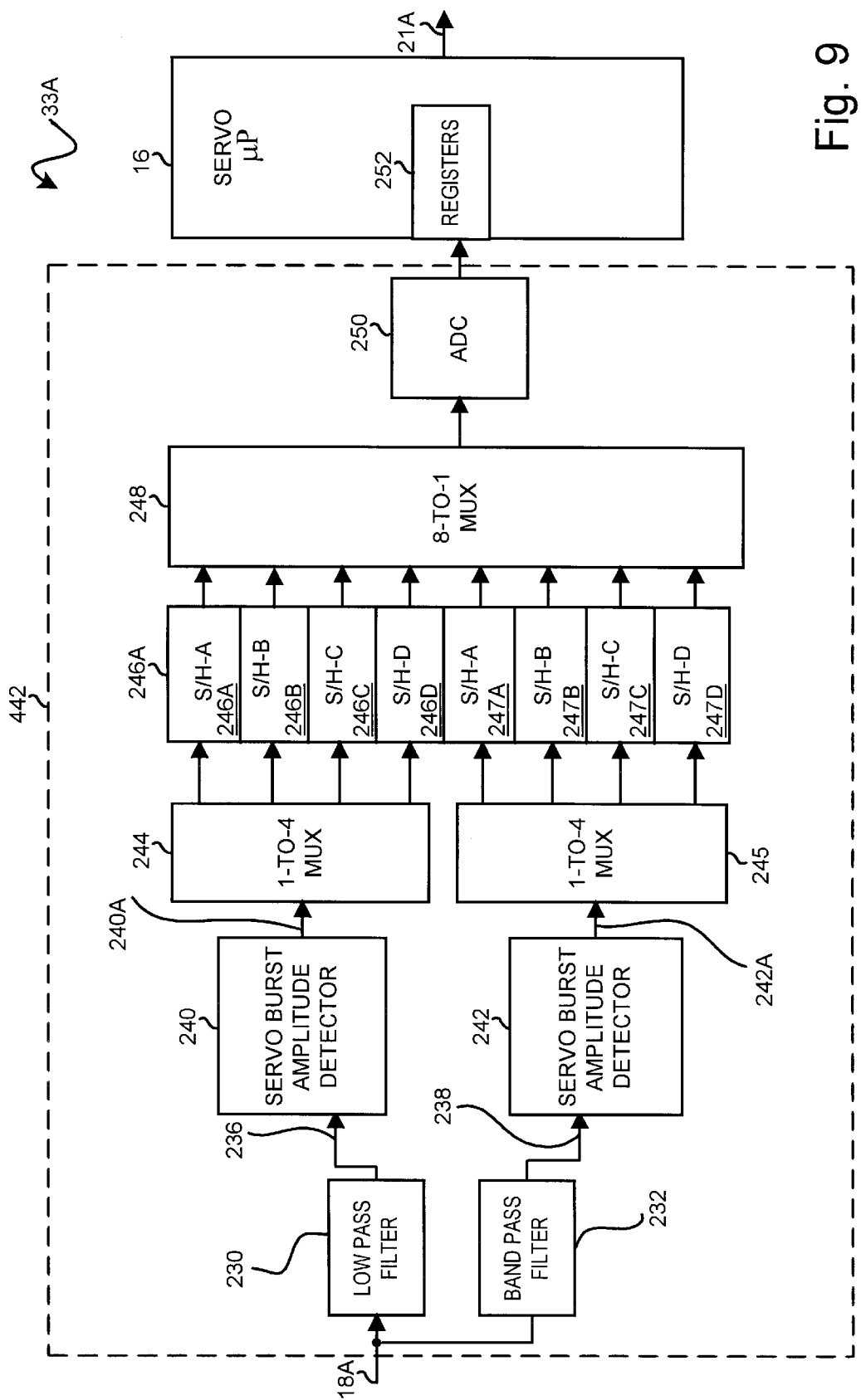
FIG. 9 is an alternate embodiment of the write condition detector in the disk drive of FIG. 2 employing an amplitude detector and a microprocessor.

Referring to FIG. 9, write condition detector 33B is an alternate embodiment of write condition detector 33 in disk drive 20 of FIG. 2. Write condition detector 33B includes an amplitude detector 442 and servo processor 16. Amplitude detector 442 provides amplitude data to servo processor 16.

Amplitude detector 442 includes a low pass filter 230, a band pass filter 232, a pair of servo burst amplitude detectors 240 and 242, a pair of one-to-four multiplexers (MUX 244, MUX 245), sample and hold circuits 246A–246D and 247A–247D, an eight-to-one multiplexer (MUX 248), and an analog to digital converter (ADC 250). Amplitude detector 442 can be included in channel electronics 36, servo controller 38, or a combination of channel electronics 36 and servo controller 38.

Suitably, one of the servo burst fields "A–D" 306–309 (FIG. 4) serves as the reference segment. Reference signal 18A that is generated from reading the servo burst fields "A–D" 306–309 will have a fundamental frequency component with higher harmonic frequency components. These higher harmonic frequency components are more sensitive to changes in head fly height. For example, the amplitude of the higher harmonic frequency components, such as the third harmonic amplitude, will decrease faster than the fundamental amplitude with increasing fly height.

Low pass filter 230 receives reference signal 18A and generates a fundamental signal 236. The fundamental signal 236 is a fundamental frequency signal of reference signal 18A. Suitably, low pass filter 230 has a passband extending from dc to fifteen megahertz.

Band pass filter 232 receives reference signal 18A and generates a higher harmonic frequency signal 238. The higher harmonic signal 238 is a higher predetermined harmonic signal of reference signal 18A. Band pass filter 232 is a higher order harmonic filter. Suitably, band pass filter 232 generates higher harmonic signal 238 that is a third harmonic of reference signal 18A, and has a passband extending from a 25 megahertz lower cut-off frequency to a 35 megahertz upper cut-off frequency. Those skilled in the art will recognize that band pass filter 232 may be realized as an external band pass filter. Suitably, band pass filter 232 may be designed with a passband that provides a fifth, seventh or higher odd harmonic frequency.

Servo burst amplitude detector 240 receives fundamental signal 236 and generates a signal 240A. Servo burst amplitude detector 240 is implemented as a conventional area detector. Signal 240A is provided to MUX 244. Servo burst amplitude detector 240 determines the amplitude of fundamental signal 236 as head 10 reads servo burst fields "A–D" 306–309. The amplitude of fundamental signal 236 during an A burst 306 is stored in sample and hold circuit 246A. The amplitude of fundamental signal 236 during a B burst 307 is stored in sample and hold circuit 246B. The amplitude of fundamental signal 236 during a C burst 308 is stored in sample and hold circuit 246C. The amplitude of fundamental signal 236 during a D burst 309 is stored in sample and hold circuit 246D.

Servo burst amplitude detector 242 receives higher harmonic signal 238 and generates a signal 242A. Signal 242A is provided to MUX 245. Servo burst amplitude detector 242 determines the amplitude of higher harmonic signal 238 as head 10 reads servo burst fields "A–D" 306–309. The amplitude of higher harmonic signal 238 during an A burst 306 is stored in sample and hold circuit 247A. The amplitude of higher harmonic signal 238 during a B burst 307 is stored in sample and hold circuit 247B. The amplitude of higher harmonic signal 238 during a C burst 308 is stored in sample and hold circuit 247C. The amplitude of higher harmonic signal 238 during a D burst 309 is stored in sample and hold circuit 247D.

The output of sample and hold circuits 246A–246D and 247A–247D are provided to MUX 248. The output of MUX 248 is provided to ADC 250. Suitably, ADC 250 is a 10 bit analog to digital converter. The output of ADC 250 is provided to servo processor 16 through servo processor registers 252. Through this mechanism any of the sampled and held versions of the amplitude of fundamental signal 236 and of higher harmonic signal 238 may be converted by ADC 250 under control of servo processor 16 and stored in servo processor registers 252.

Servo processor 16 reads servo processor registers 252 to compare the ratio of fundamental and harmonic amplitudes signals 236 and 238 to a threshold level and generates write condition signal 21A. Write condition signal 21A corresponds to write condition signal 21 of FIG. 2.

Suitably, the registered signal with the largest amplitude for the fundamental or higher harmonic frequency and its counter part are used to compute the fly-height-representing signal. For example, servo processor 16 searches for the largest fundamental frequency amplitude and uses its higher harmonic frequency amplitude counterpart and computes their ratio as the fly-height-representing signal.

Alternatively, servo processor 16 adds the amplitude of fundamental signal 236 during the A burst to the amplitude of fundamental signal 236 during the B burst to generate a combined harmonic amplitude if head 10 is track following on the A and B bursts. Servo processor 16 also adds the amplitude of higher harmonic signal 238 during the A burst to the amplitude of the higher harmonic signal 238 during the B burst to generate a combined higher harmonic amplitude if the head is track following on the A and B bursts.

Servo processor 16 adds the amplitude of fundamental signal 236 during the C burst to the amplitude of fundamental signal 236 during the D burst to generate a combined fundamental amplitude if head 10 is track following on the C and D bursts. Servo processor 16 also adds the amplitude of higher harmonic signal 238 during the C burst to the amplitude of higher harmonic signal 238 during the D burst to generate a combined higher harmonic amplitude if head 10 is track following on the C and D bursts.

The combinations are computed to take advantage of the characteristics of the servo bursts where normally the combination of the A and B bursts are a constant and the combination of the C and D bursts are a constant. Servo processor 16 then computes the ratio of the combined higher harmonic amplitude to the combined fundamental amplitude to compute a fly-height-representing signal internal to servo processor 16. The fly-height-representing signal may then be compared to a high-fly (or low-fly) threshold computed as described herein. The result of the comparison to the stored threshold is write condition signal 21A. Write condition signal 21A is provided to register 41 in servo controller 38.

Figure 10:
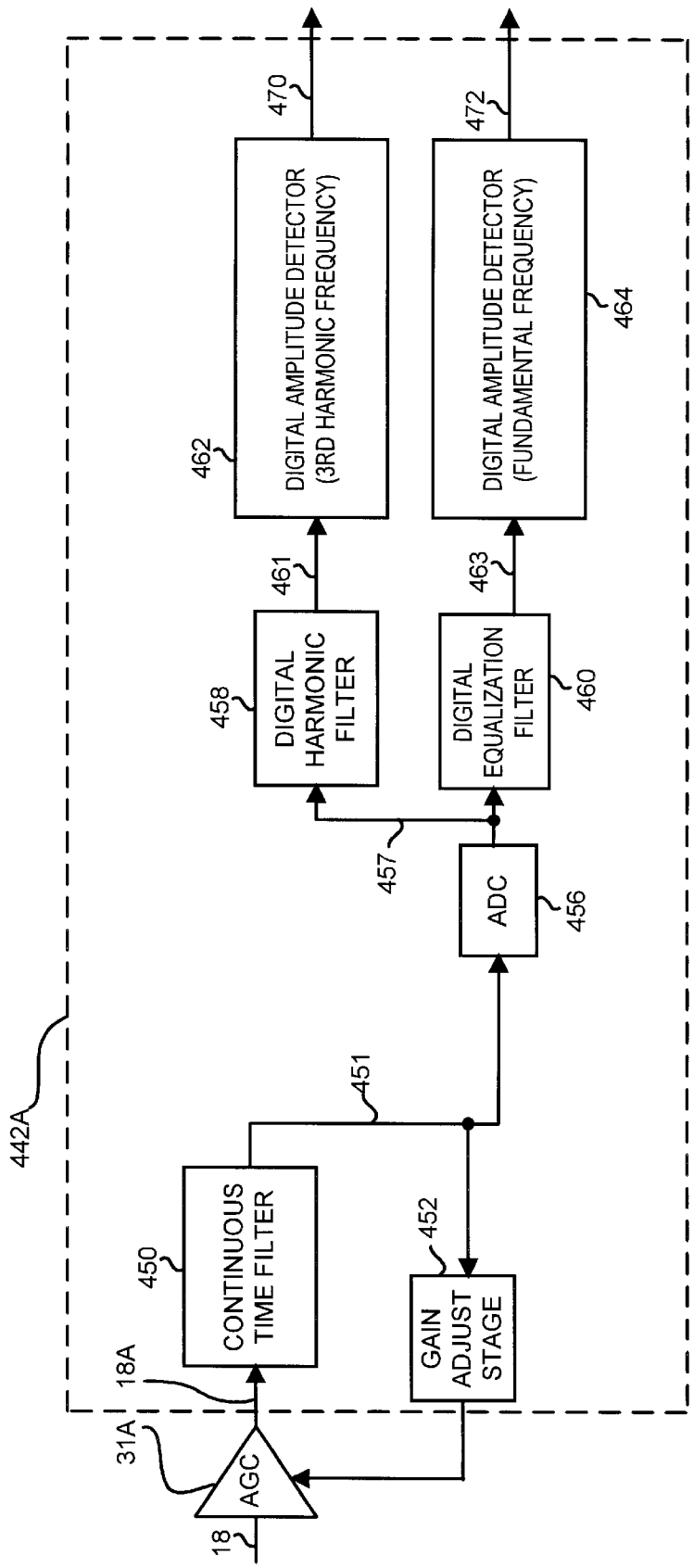
FIG. 10 shows an alternate embodiment of the amplitude detector in the write condition detector of FIG. 9.

Referring to FIG. 10, amplitude detector 442A is an alternative embodiment of amplitude detector 442 (FIG. 9). Generally, amplitude detector 442A employs digital signal processing to compute the amplitudes of the fundamental and higher harmonic frequency components of reference signal 18A. Amplitude detector 442A includes a continuous time filter (CTF 450), a gain adjust stage 452, an analog to digital converter (ADC 456), a digital harmonic filter 458, a digital equalization filter 460, digital amplitude detector 462 (third harmonic frequency), and a digital amplitude detector 464 (fundamental frequency).

Reference signal 18 is provided to AGC 31A having a frequency of approximately 20 megahertz. AGC 448 receives reference signal 18 and generates a reference signal 18A. CTF 450 receives reference signal 18A and generates a filtered reference signal 451. Suitably, CTF 450 is a low pass filter with a pass band from DC to 80 megahertz. Filtered reference signal 451 is fed back through gain adjust stage 452 to AGC 448. The feedback through gain adjust stage 452 is set to maintain filtered reference signal 451 at a predetermined voltage level. Filtered reference signal 451 is also provided to ADC 456. ADC 456 receives filtered reference signal 451 and generates a digital reference signal 457.

Digital third harmonic filter 458 receives digital reference signal 457 and generates a third harmonic digital signal 461.

Digital third harmonic filter 458 provides a bandpass filter function similar to bandpass filter 232 (FIG. 9). Suitably, digital third harmonic filter 458 has a passband from approximately 40 megahertz to 60 megahertz. Third harmonic digital amplitude detector 462 receives third harmonic digital signal 461 and generates a higher harmonic amplitude signal 470.

Digital equalization filter 460 receives digital reference signal 457 and generates a fundamental digital signal 463. Suitably, digital equalization filter 460 has a passband from DC to 40 megahertz. Fundamental digital amplitude detector 464 receives fundamental digital signal 463 and generates a fundamental amplitude signal 472.

Those skilled in the art will recognize that the various filter passbands may vary depending on fundamental frequency, particular component selections and the desired quality and processing rate of the circuit. Servo processor 16 receives higher harmonic amplitude signal 470 and fundamental amplitude signal 472 to generate the fly-height-representing signal. The fly-height-representing signal represents the ratio of higher harmonic amplitude signal 470 to fundamental amplitude signal 472.

Figure 11:
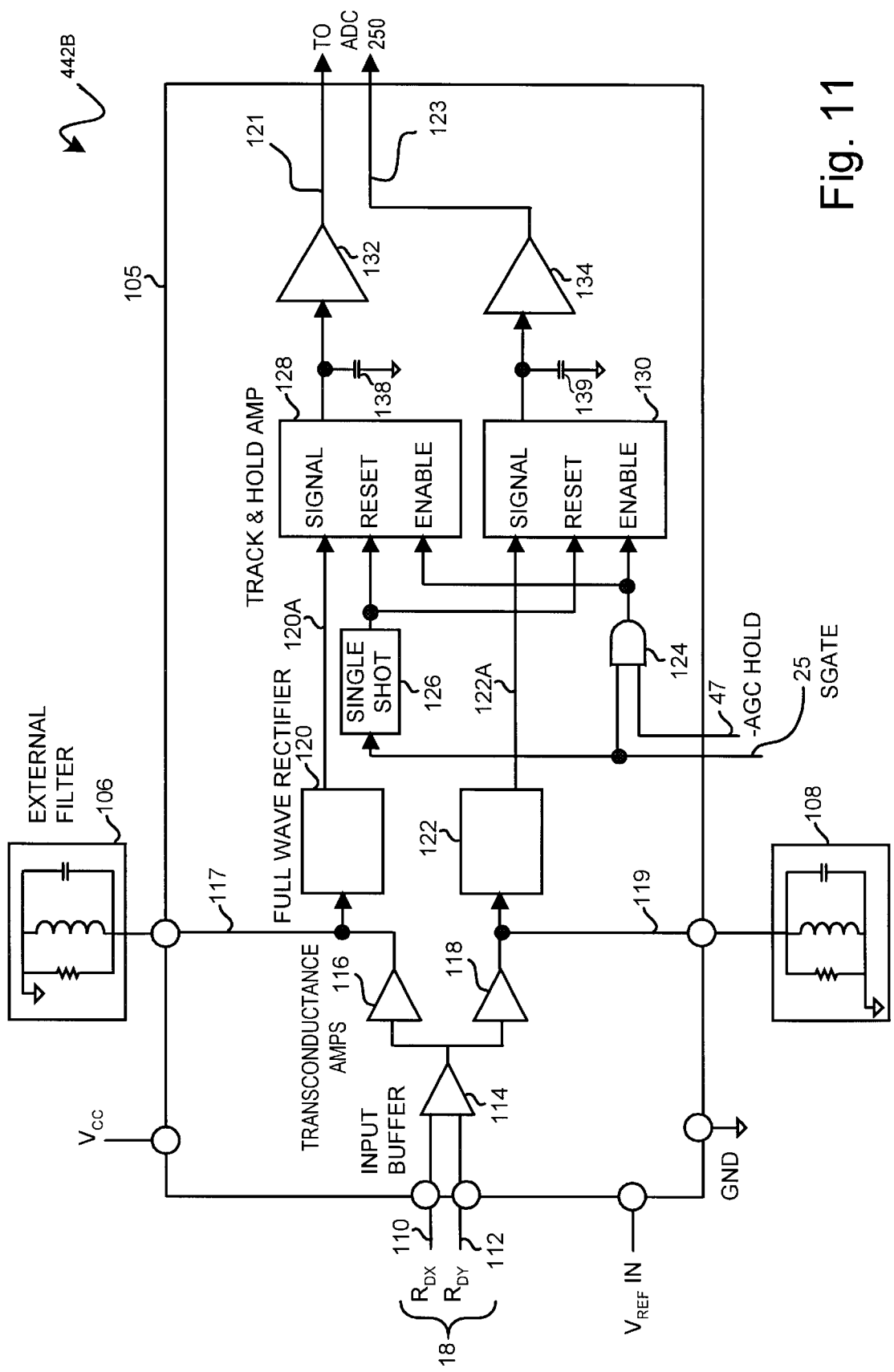
FIG. 11 shows another alternate embodiment of the amplitude detector in the write condition detector of FIG. 9.

Referring now to FIG. 11, amplitude detector 442B is another alternative embodiment of amplitude detector 442 (FIG. 9).

Generally, amplitude detector 442B may be implemented in a stand alone integrated circuit 105 used in conjunction with an existing channel 36 and creates two signal processing chains: one chain for the fundamental components of reference signal 18 and another for the higher harmonic components of reference signal 18. Each chain utilizes a track and hold circuit to detect the envelope of a current signal version of a filtered reference signal. The track and hold circuit allows amplitude detector 442b to operate when head 10 reads a servo segment.

An input buffer 114 accepts conventional differential head signals 110 and 112 of reference signal 18. The input buffer 114 provides the reference signal to two transconductance amplifiers 116 and 118. The outputs of amplifiers 116 and 118 are connected respectively to two external filters represented graphically by 106 and 108 to produce filtered signals 117 and 119. First external filter 106 is tuned to the fundamental frequency of reference signal 18 and second external filter 108 is tuned to a higher harmonic frequency of reference signal 18. For example, the passband of the first external filter 106 is set from DC to 20 Megahertz and the passband of the second external filter 108 is set from 40 megahertz to 60 megahertz.

Filtered fundamental signal 117 is connected to full wave rectifier 120. The full wave rectifier 120 rectifies, or takes the absolute value of, the filtered fundamental signal 117 and provides a rectified fundamental signal output. The rectified fundamental signal output is now suitable to be tracked and held to determine its amplitude.

Filtered harmonic signal 119 is connected to full wave rectifier 122. The full wave rectifier 120 rectifies, or takes the absolute value of, the filtered higher harmonic signal 119 and provides a rectified higher harmonic signal output.

The output of full wave rectifier 120 is sent to a track and hold amplifier 128. The track and hold amplifier 128 is designed to capture the amplitude of a signal during a predetermined tracking period. Full wave rectifier 122 provides a rectified signal to track and hold amplifier 130 in a similar manner. Track and hold amplifiers 128 and 130 are initially reset by single shot 126 that is triggered by servo gate signal, SGATE signal 25 to produce a reset pulse.

SGATE 25 and the AGC hold signal (−AGC HOLD signal 47) are AND'ed in AND gate 124 to provide the enable signal for track and hold amplifier 128 and track and hold amplifier 130. The output of track and hold amplifier 128 is provided to capacitor 138. The capacitor 138 provides the fundamental amplitude signal 121 through buffer 132. The output of track and hold amplifier 130 is provided to capacitor 139. The capacitor 139 provides the higher harmonic amplitude signal 123 through buffer 134. The track and hold amplifiers are reset immediately after the SGATE signal 25 is asserted and track the input signals 120*a* and 122*a* while the SGATE signal 25 is true and the −AGC hold signal 47 is false, i.e. high, to cause the output of AND gate 124 to be true at the start of a servo operation. The higher harmonic amplitude signal 123 and the fundamental amplitude signal 121 are processed with a multiplexed input to an analog to digital converter, such as ADC 250 shown in FIG. 9 or as may be incorporated in integrated circuit 105. When the −AGC hold signal 47 is activated, the track and hold amplifiers 128 and 130 hold their respective input signals long enough so that the signal does not change during conversion by the ADC 250.

Servo processor 16 then computes the ratio of the higher harmonic amplitude signal 123 to the fundamental amplitude signal 121 as the fly-height-representing signal. Timers may be used to determine the start and end of the track period as described above.

In an alternate embodiment, the analog higher harmonic amplitude signal 123 and the fundamental amplitude signal 121 are driven off chip to an external chip where the signals are processed with an analog to digital converter. Capacitors 138 and 139 may be also be constructed off chip.

Figure 12:
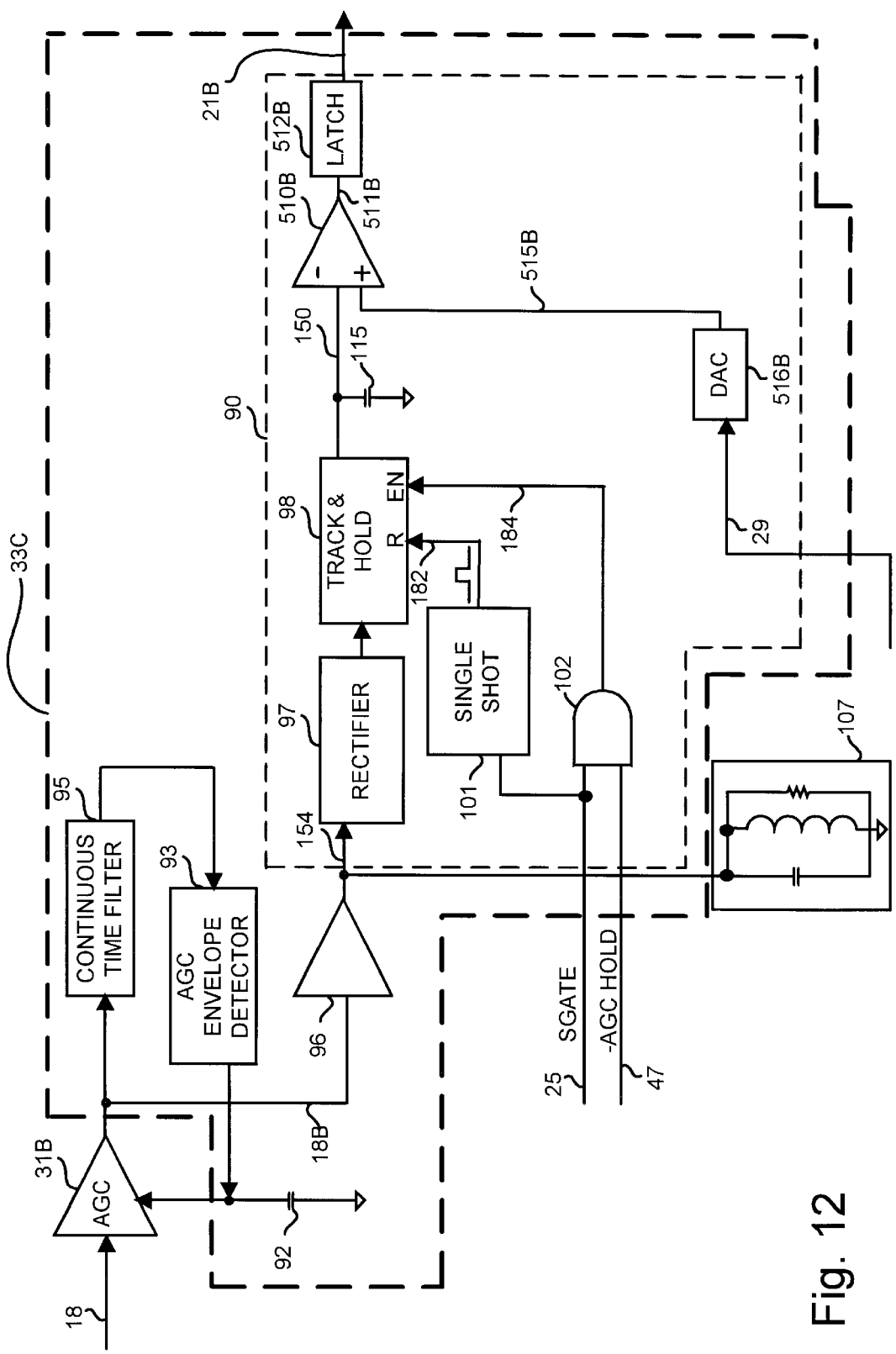
FIG. 12 shows an alternate embodiment of the write condition detector in the disk drive of FIG. 2 employing an amplitude and threshold detector.

Referring to FIG. 12, write condition detector 33C is another alternate embodiment of write condition detector 33 in disk drive 20 of FIG. 2. Generally write condition detector 33C holds the amplitude of the fundamental frequency component of reference signal 18 to a predefined voltage thereby eliminating the need to measure the amplitude of the fundamental frequency component. As a result, the fly-height representing signal is the amplitude of the higher harmonic frequency component of reference signal 18.

A variable gain amplifier AGC 31*b* is connected to receive reference signal 18. AGC 31B is controlled by a feedback loop comprising continuous time filter CTF 95, AGC envelope detector 93, and voltage compensation capacitor 92. CTF 95 filters AGC 31*b* output signal 18B to provide a fundamental frequency signal to AGC envelope detector 93. AGC envelope detector 93 provides feedback to AGC 31B through gain control capacitor 92 to stabilize the gain of AGC 31B.

Amplified reference signal 18B is buffered and filtered by transconductance amplifier 96 and a bandpass network 107 to provide a harmonic signal 154, tuned to a desired harmonic of the fundamental frequency, to an amplitude detector 90 for producing a write condition signal 21B analogous to write condition signal 21 in FIG. 2.

Amplitude detector 90 comprises a rectifier 97, a track and hold circuit 98, a single shot 101, a digital to analog converter DAC 516B, a comparator 510B and a latch 512B. Filtered harmonic signal 154 is rectified by rectifier 97 to provide an absolute value of the harmonic signal to track and hold circuit 98. Track and hold circuit 98 is initialized (reset) at the beginning of a servo sector by a rising edge of SGATE 25 which triggers a reset pulse 182 from single shot 101. During the time −AGC hold signal 47 is positive, AND gate 102 enables track and hold 98 to monitor the output of rectifier 97 and store the amplitude of the harmonic signal 150 in capacitor 115 via enable line 184.

A high fly threshold value provided by servo processor 16 is stored in DAC 516B via serial communications line 29. DAC 516B provides a threshold voltage 515 to comparator 510B. The threshold voltage 515B is compared to the harmonic signal amplitude 150 and, if the threshold is exceeded, high fly signal 511B will be asserted by comparator 510B. High fly signal 511B is latched in latch 512B to provide write condition signal 21B.

FIG. 13A shows an amplitude and threshold detector 90A that is an alternate embodiment of amplitude and threshold detector 90 of FIG. 12. The filtered signal 154 is connected to an amplitude detector 388. The amplitude detector 388 computes the amplitude of the filtered signal 154 and holds the amplitude long enough for conversion. The output of the amplitude detector 388 is provided to an analog to digital converter (ADC 390). The ADC 390 provides the higher harmonic amplitude signal, which in this case is also the fly-height-representing signal 391, to servo microprocessor 16.

The microprocessor 16 is programmed to produce a write condition signal 21C based on the fact that the reference signal 18A has been gain controlled to a predetermined voltage amplitude. The microprocessor 16 compares the fly-height-representing signal 391 to a stored threshold as described below to compute the write condition signal 21C.

FIG. 13B shows an amplitude and threshold detector 90B that is another alternate embodiment of amplitude and threshold detector 90 of FIG. 12. The filtered signal 154 is connected to an amplitude detector 388. The amplitude detector 388 computes the amplitude of the filtered signal 154. The output of the amplitude detector 388 is the fly-height-representing signal 389. The fly-height-representing signal 389 is provided to an analog comparator 510C. The output of the comparator 510C is connected to a port on the microprocessor 16.

Microprocessor 16 sends a threshold value to DAC 516C. The output of DAC 516C, threshold voltage 515B, is provided to the second input of comparator 510C. The output of the comparator 510C provides a comparison signal 511C to a port on the microprocessor 16 that indicates whether or not the threshold value has been exceeded. The microprocessor 16 then provides a write condition signal 21c following the methods described herein. By only having to check one bit, the processing load on the microprocessor 16 is reduced.

Figure 14:
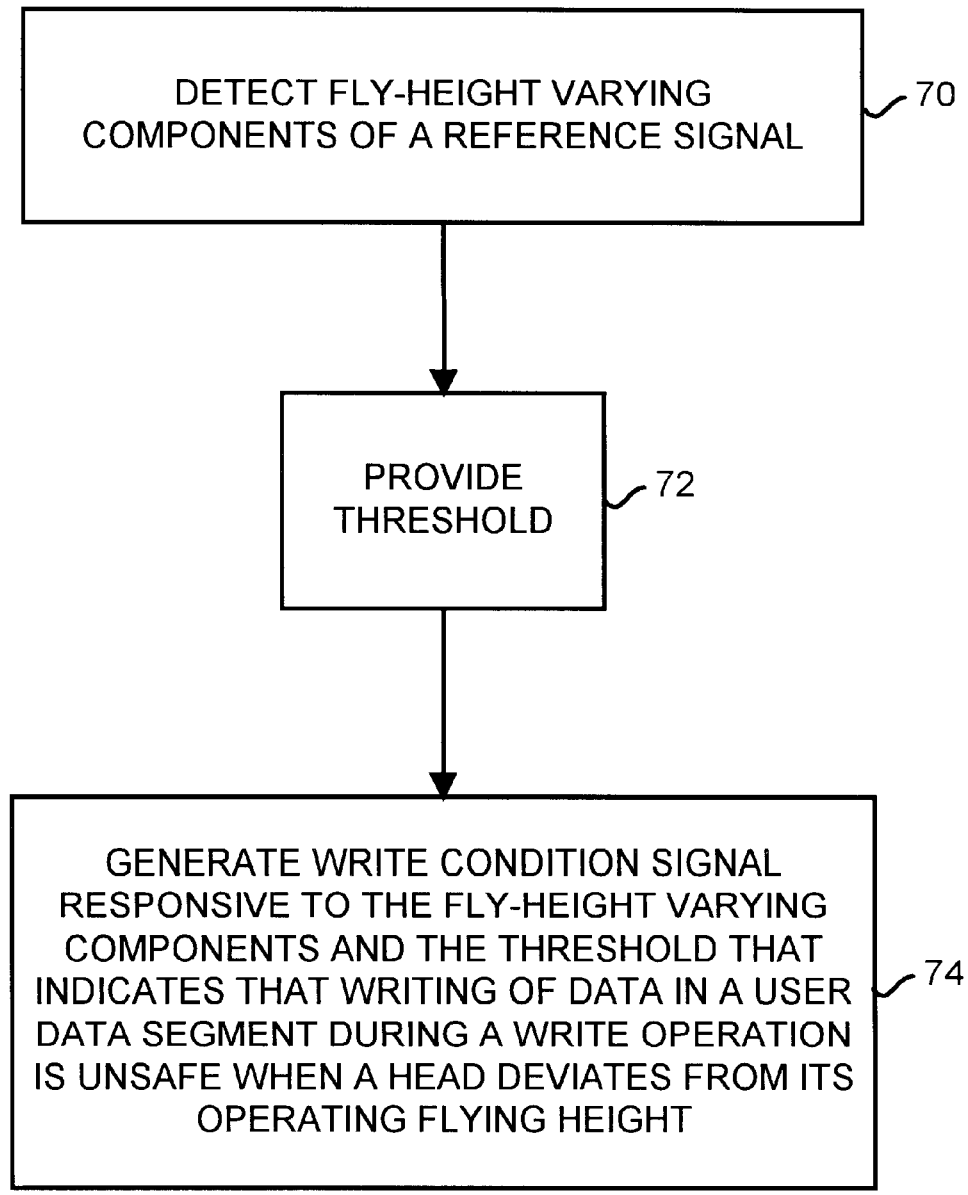
FIG. 14 shows a flow chart of a method for generating a write condition signal that indicates that writing of data in a user data segment is unsafe when a fly-height-representing signal exceeds a threshold value.

FIG. 14 shows a method for generating write condition signal 21 for use in disk drive 20 having head 10 and recording surface 89. Recording surface 89 includes track 201 having user data segment 1A and periodic reference segment 3A. Head 10 flies above recording surface 89 at a fly height that varies as head 10 flies. During a write operation, head 10 writes data in user data segment 1A. During the write operation, head 10 produces reference signal 18 while reading periodic reference segment 3A. AGC 31 receives reference signal 18 and generates reference signal 18A.

At step 70, write condition detector 33 processes reference signal 18A during the write operation, while SGATE signal 25 and ENWCD signal 32 are asserted, to detect fly-height varying components of reference signal 18A. The fly-height varying components represent a fly height of head 10 while enable signal 32 is asserted. Reference signal 18A is generated from a periodic reference segment that may be a predetermined periodic signal recorded on a track. For example, the periodic reference segment may be part of a servo segment (such as the AGC/PLO field 303 or servo bursts 306–309).

Each of the fly-height varying components can comprise a fly-height representing signal. Alternatively, the ratio of the area of reference signal 18A to the peak of the reference signal 18A can comprise the fly-height-representing signal. According to another embodiment, the ratio of the amplitude of a selected higher harmonic frequency component, such as the third harmonic, and the fundamental frequency component of reference signal 18A comprises the fly-height-representing signal.

At step 72, servo processor 16 computes a threshold value based on a stored zone coefficient. The threshold value represents a fly height threshold for head 10. The zone coefficients are determined as described below.

At step 74, write condition detector 33 generates write condition signal 21, responsive to the fly-height varying components and the threshold value, to indicate that writing of data in the user data segment during the write operation is unsafe.

Computing Zone Coefficients During Manufacturing of Disk Drive 20

The disclosure of commonly owned co-pending patent application Ser. No. 08/918,025, filed Aug. 25, 1997, entitled "DISK DRIVE WITH SEPARATELY DETERMINED SERVO AND DATA TRACK PITCH" is incorporated herein by reference (the "incorporated application"). The incorporated application discloses a servo track and data track structure employing a ratio of 1.5:1 between a data track pitch and a servo track pitch. This servo track and data track structure affects odd tracks more than even tracks because odd data tracks straddle two servo tracks. Due to this servo track and data track structure, the odd tracks have a phase misalignment that results in increasing the PW50 for the odd tracks.

Suitably, recording surface 89 has the servo track and data track structure disclosed in the incorporated application. Because of the phase misalignment for odd tracks, zone coefficients are computed separately for odd and even tracks. Alternatively, recording surface 89 can have a servo track and data track structure that does not result in the phase misalignment, and which permits having the same zone coefficients for odd and even tracks.

The zone coefficients are determined during an intelligent burn in (IBI) process that occurs during manufacturing of disk drive 20. The zone coefficients are determined separately for odd and even tracks, and for each head, zone combination. Alternatively, zone coefficients are the same for odd and even tracks. The determination of zone coefficients must of necessity be performed quickly due to time and cost constraints. A number of zone test tracks are selected.

Referring to FIG. 3, three zones (207, 208, 209) have example test tracks in each zone. Zone 207, with test tracks 144 and 145, will be used to illustrate the computation of zone coefficients during the manufacturing of disk drive 20. A predetermined number of odd and even tracks are selected near the test tracks 144 and 145. The threshold calculation is done for the odd tracks separately from the even tracks.

At each selected test track, a threshold measurement procedure is followed. In the procedure, a seek is performed to the track. While track following, the value of a programmable threshold is set to a high value by servo processor 16. Write condition signal 21 is monitored (polled) by servo processor 16. A high-flying height threshold is reduced by a predetermined amount until write condition signal 21 indicates a high-fly write condition. The value will, for most cases, not represent an actual high-fly condition but will represent the nominal fly height of head 10.

To reduce the effect of error due to noise and the potential for a real high-fly condition, the measurement may be taken multiple times and at nearby tracks and averaged to result in an averaged value for the test track. The measurements may also be taken at certain track intervals across a zone.

Multiple tests at various track locations are taken for each zone. These results are then fit to a linear equation, with a least squares fit, to obtain the zone coefficients. Higher order fits may also be used. The zone coefficients are then stored for each zone and head combination for the odd and the even tracks. Suitably, the zone coefficients are stored on recording surface 89 and provided to servo processor 16 during power up of disk drive 20.

Testing only a few tracks in a zone speeds up the intelligent burn in process during the manufacturing of disk drive 20, and storing zone coefficients saves memory space.

In an alternate embodiment, the intelligent burn in process determines a nominal fly height for all tracks on disk 12. The high-fly threshold is then stored for each head and track combination, avoiding the need for estimation and subsequent processing. Alternatively, zone coefficients may be used to compute high-fly thresholds for each track during the intelligent burn in and stored for each head and track combination.

Figure 15:
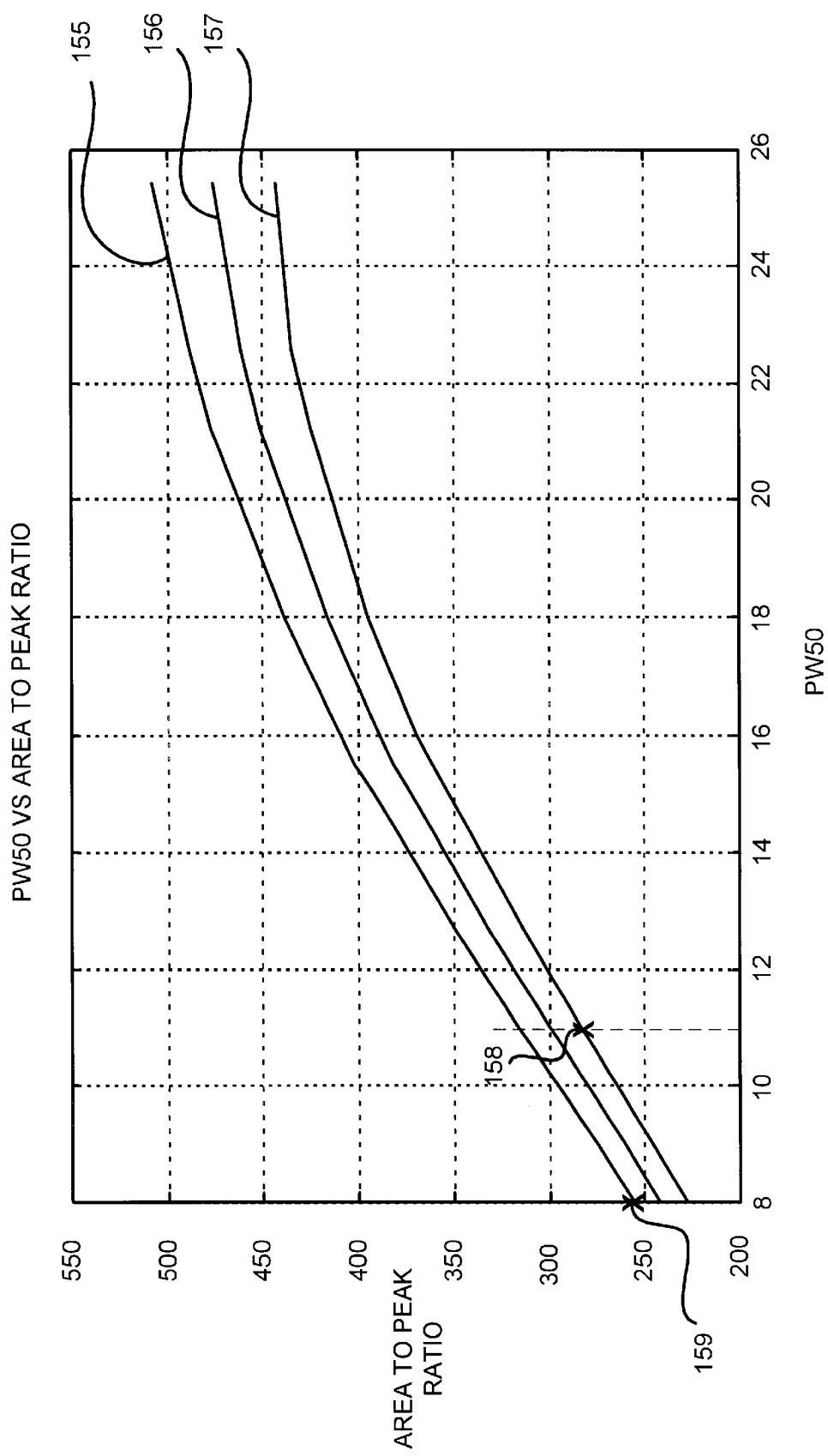
FIG. 15 shows a graph of the average to peak ratio as a function of PW50 from a simulation of the disk drive 20 of FIG. 2.

The reference signal used to represent flying height can be characterized by its PW50 value. The flying height can then be represented by a PW50 value which varies as the head is moved from the ID to the OD of the disk. PW50 is a well known means of characterizing the pulse response from isolated transitions in digital signal recordings. In disk drives, the PW50 is typically expressed in nanoseconds, abbreviated as "ns". Although PW50 is measurable in a design environment, it is not practically measured in an operating disk drive. The average area to peak ratio of the reference signal is more practically measured and can serve as a PW50 indicator by obtaining a plot of the relationship between a given PW50 and its corresponding area to peak ratio. FIG. 15 provides such a plot for an exemplary disk drive from simulation using a $4^{th}$ order pulse model and a signal to noise ratio of 24 dB. Curve 156 represents the nominal case for area to peak ratio in arbitrary count values (Y-axis) vs. PW50 in ns (X-axis). Curve 155 provides a+3σ case while curve 157 provides the −3σ case. The plot in FIG. 15 then allows for calculating threshold values when flying height data is provided as follows.

Table 1 below provides a definition, in the exemplary disk drive, of PW50 values in ns associated with nominal (even) tracks and corresponding high fly (HF) conditions including variations owing to location (ID,OD), variance due to the aforementioned odd track servo sector arrangement (1σ variance), and worst case for nominal flying height (+3σ odd track variance). Also included is a high fly value which represents a 100% increase in flying height from the worst case nominal, calculated as a factor of √2.

Now with the graph of FIG. 15 and Table 1, we can establish high fly threshold values across the disk radius and determine the resolution required for the DAC 516 of FIG. 5. For example Table 1 shows that an even track at the disk OD has an average PW50 of 8 ns. Allowing for statistical variation, we would apply the corresponding +3σ (highest apparent nominal) value from curve 155 on the graph yielding an area to peak ratio value of 256, indicated at 158. The high fly PW50 for this point is nominally 11 ns from Table 1. The area to peak ratio for the high fly at this point is determined by applying the corresponding −3σ value (lowest apparent high fly) from curve 157 yielding a value of 283, indicated at 159. The net difference between the two ratios is 10.5% (283/256). Suitably we would set a threshold point which is halfway between the two, therefore a resolution of half the difference (5.25%) is required. This would be satisfied by a resolution of 5 bits (32 steps=3.1% per step).

According to the above defined process, Table 2 shows the expected difference expressed in percent between nominal and high fly area to peak ratios at disk ID and OD from the graph of FIG. 15 and PW50 values in Table 1.

TABLE 2

| Location | % Even Track | % Odd Track | % Odd 3σ |
|---|---|---|---|
| OD | 10.5 | 14 | 14 |
| ID | 8.4 | 6.3 | 1 |

From Table 2 we can determine that a marginal condition would exist in detecting the difference between a nominal and high flying head at the worst case point (% Odd 3σ column) at the ID because only 1% of difference would be shown. The separation between the high fly and nominal area to peak ratios will however improve with higher signal to noise ratio. Therefore the system implementation would be specified to have a higher signal to noise ratio, for example 28 dB.

The following is a method for calibrating a high-fly threshold value for zone 207 on recording surface 89 during manufacturing of disk drive 20. This method is suitable for disk drive 20 employing write condition detector 33 of FIG. 5. The high-fly threshold value is calibrated so that head 10 is considered to be flying at an operating flying height until it deviates 40% above a nominal flying height to an unsafe high flying height. This calibration method assumes the following parameters for head 10 flying at the nominal flying height over test track 144 in zone 207:

a. reference signal 18A has a PW50 equal to 8 ns;

b. ENWCD signal 32 is asserted for a period of 500 ns and:

i. integrator 504 receives rectified reference signal 503 and generates area reference signal 505 representing a value equal to 0.6 v; and ii. peak detector 508 receives rectified reference signal 503 and generates peak reference signal 509 representing a value equal to 0.8 $v_{peak}$.

TABLE 1

| Location | Nominal Even | Nominal Even HF | Nominal Odd | Nominal Odd HF | Worst case nominal | High fly ← * √2 |
|---|---|---|---|---|---|---|
| OD | 8 | 11 | 9 | 12.7 | 11 | 15.5 |
| ID | 15 | 21.2 | 16 | 22.6 | 18 | 25.4 |

Table 3 shows the PW50 and the area:peak ratio for nominal and unsafe flying heights of head 10.

TABLE 3

PARAMETERS FOR NOMINAL AND UNSAFE FLYING HEIGHTS

| Reference Signal 18A | Nominal Flying Height | Unsafe Flying Height (40% deviation from nominal flying height) | |
| --- | --- | --- | --- |
| | | Unsafe High-Flying Height (+40% deviation) | Unsafe Low-Flying Height (−40% deviation) |
| PW50 | 8 ns | 11.2 ns | 4.8 ns |
| Area | .6 v | .84 v | .36 v |
| Peak | .8 v | .8 v | .8 v |
| Area:Peak Ratio | .75 | 1.05 | .45 |

Column 1 shows components of reference signal 18A that can be used for characterizing the flying-height of head 10. Column 2 shows values for the components of reference signal 18A when head 10 is flying at the nominal flying height. Column 3 shows values for the components of reference signal 18A when head 10 is flying at an unsafe high-flying height and an unsafe low-flying height. The values for the unsafe high-flying height define high-fly threshold values. The values for the unsafe low-flying height define low-fly threshold values.

The calibration method assumes that that head 10 is flying over track 144, in zone 207, at an operating flying height. The operating flying height varies as head 10 is moved from the ID to the OD of disk 12. The high-fly threshold value for zone 207 is calibrated in the following manner:

a. ENWCD signal 32 is asserted for a period of 700 ns, which is 40% longer than the period of 500 ns for head 10 flying at the nominal flying height;
  i. integrator 504 receives reference signal 503 and generates area reference signal 505 representing a value equal to 0.84 v, which is 40% higher than the value of 0.6 v for head 10 flying at the nominal flying height;
  ii. peak detector 508 receives reference signal 503 and generates peak reference signal 509 representing a value equal to 0.8 $v_{peak}$, which is the same as the value of 0.8 v for head 10 flying at the nominal flying height due to AGC 31 maintaining a substantially constant amplitude;
c. Multiplying DAC 516 combines area reference signal 505 and a digital high-fly threshold value to generate a scaled area reference signal 515 (combined area reference/high-fly threshold signal 515); and
d. The digital high-fly threshold value is calibrated so that the voltage level for the scaled area reference signal 515 is below the voltage level for peak reference signal 509.

The step of increasing the period for asserting ENWCD signal 32 by 40% (from 500 ns to 700 ns), while head 10 is flying at an operating flying height, increases areas reference signal 505 by 40% to simulate area reference signal 505 for head 10 flying at an unsafe high-flying height. However, because head 10 is assumed to be flying at an operating flying height, the digital high-fly threshold value is adjusted so that scaled area reference signal 515 is below the voltage level for peak reference signal 509.

Computing High-fly and Low-fly Thresholds During Normal Disk Drive Operations

During seek operations to a target track, the high-fly threshold is computed based on zone coefficients determined during manufacturing of disk drive 20. The zone coefficients can be stored on recording surface 89 and provided to servo processor 16 during power up of disk drive 20. Suitably, a threshold register, such as a digital value register in DAC 516, has a resolution of five binary bits.

When the host computer instructs disk drive 20 to perform a write operation, the seek operation is initiated by interface processor 40. During the seek operation, servo processor 16 receives the target track number from interface processor 40. Servo processor 16 provides commands to servo controller 38 to drive actuator/suspension assembly 14 to move head 10 over the target track. For a write operation, the seek operation positions head 10 over a track with an available user data segment. Servo information is read from disk 12 to determine the position of head 10 in relation to disk 12. Also, threshold information needed to initialize write condition detector 33 is computed by servo processor 16 based on the target track number.

Servo processor 16 determines to what zone the destination track belongs. Servo processor 16 then fetches zone coefficients for the high-fly threshold calculation for the zone of the destination track of the seek. The zone coefficients are a slope for the zone and an intercept for the zone as a linear function of track number:

High-fly threshold=Slope for the Zone * Track Number+Intercept for the Zone

Servo processor 16 computes the high-fly threshold based on the target track number, head number and zone coefficients. Servo processor 16 then sends the high-fly threshold to servo controller 38 over servo bus 56. Servo controller 38 sends the high-fly threshold for the current track and head to write condition detector 33 through serial communications line 29.

Write condition detector 33 receives and processes reference signal 18A into the fly-height varying components, receives a high-fly (or low-fly) threshold value, and generates write condition signal 21 in response to the fly-height varying components and the high-fly (or low-fly) threshold value. Write condition detector 33 asserts write condition signal 21 when head 10 deviates from an operating flying height to an unsafe high-flying height. Alternatively, write condition detector asserts write condition signal 21A when head 10 deviates from the operating flying height to an unsafe low-flying height.

Write condition detector 33 is enabled by servo controller 38 to detect the fly-height varying components while head 10 is reading the periodic reference segment. The periodic reference segment includes a periodic signal that is written during manufacturing of disk drive 20 on tracks 201 of disk 12. For example, the periodic reference segment can be AGC/PLO field 303 or one of servo burst fields 306–309.

Write condition detector 33 can include hardware and/or firmware components to generate and process the fly height varying components and the high-fly (or low-fly) threshold value. For example, servo controller 38 enables write condition detector 33 to detect fly height varying components from reference signal 18A. The fly height varying components of reference signal 18A can be an area reference signal and a peak reference signal; or a fundamental frequency component and a higher frequency component.

For example, write condition detector 33 can include hardware components for generating and processing the fly height varying components and the high-fly threshold value, and asserting write condition signal 21 when head 10 has deviated from an operating flying height to an unsafe high-flying height. Alternatively, interface processor 40 (or servo processor 16) can compute the ratio of two components of reference signal 18a to generate a fly-height-representing signal. Also, interface processor 40 (or servo processor 16) can compare the fly-height-representing signal to the high-fly threshold value and assert a write condition signal (such as signal 21) when head 10 is flying above the high-fly threshold value.

The flying height of head 10 is monitored during normal disk drive write operations to determine if the flying height of head 10 has deviated from its operating flying height to an unsafe flying height. Monitoring the flying height of head 10 can improve the integrity of write operations and reduce read errors due to high-fly write conditions during the write operation. Also, monitoring the flying height of head 10 for low-fly write conditions can provide a warning for an impending head crash.

We claim:

1. A disk drive having a head and a recording surface, wherein the recording surface includes a track having a user data segment and a periodic reference segment, wherein the head flies above the recording surface at a fly height that varies as the head flies, wherein during a write operation the head writes data in the user data segment, and wherein during the write operation the head produces a reference signal when reading the periodic reference segment, wherein the disk drive comprises:

integrator means, responsive to the reference signal, for integrating the reference signal to generate an area signal;

peak detector means for detecting a peak in the reference signal to generate a peak signal; and means, responsive to the area signal and the peak signal, for generating a write condition signal that indicates that writing of data in the user data segment during the write operation is unsafe.

2. The disk drive of claim 1 wherein the write condition signal indicates a high-fly write condition.

3. The disk drive of claim 1 wherein the write condition signal indicates a low-fly write condition.

4. The disk drive of claim 1
   further comprising a rectifier means, responsive to the reference signal, for producing a rectified reference signal, wherein the integrator means and the peak detector means are responsive to the rectified reference signal.

5. The disk drive of claim 1 wherein the means for generating a write condition signal further comprises a comparator.

6. The disk drive of claim 1 further comprising a means for suspending write operations in the disk drive responsive to the write condition signal.

7. The disk drive of claim 1 wherein the recording surface comprises a servo sectored disk.

8. The disk drive of claim 1 wherein the periodic reference segment comprises part of a servo segment.

9. The disk drive of claim 1 wherein the periodic reference segment comprises an AGC/PLO field of a servo segment.

10. The disk drive of claim 1 wherein the periodic reference segment comprises a servo burst field of a servo segment.

11. The disk drive of claim 1 further comprising a
    low pass filter means, responsive to the reference signal, for producing a noise reduced reference signal, wherein the integrator means and the peak detector means are responsive to the noise reduced reference signal.

12. The disk drive of claim 1 wherein the integrating means comprises a servo burst amplitude detector.

13. The disk drive of claim 1 wherein the means for generating the write condition signal is connected to a servo gate signal to enable the means for generating the write condition signal.

14. An integrated circuit for use in a disk drive having a head and a recording surface, wherein the recording surface includes a track having a user data segment and a periodic reference segment, wherein the head flies above the recording surface at a fly height that varies as the head flies, wherein during a write operation the head writes data in the user data segment, and wherein during the write operation the head produces a reference signal when reading the periodic reference segment, wherein the integrated circuit comprises:

integrator means, responsive to the reference signal, for integrating the reference signal to generate an area signal;

peak detector means for detecting a peak in the reference signal to generate a peak signal; and means, responsive to the area signal and the peak signal, for generating a write condition signal that indicates that writing of data in the user data segment during the write operation is unsafe.

15. A method for generating a write condition signal for use in a disk drive having a head and a recording surface, wherein the recording surface includes a track having a user data segment and a periodic reference segment, wherein the head flies above the recording surface at a fly height that varies as the head flies, wherein during a write operation the head writes data in the user data segment, and wherein during the write operation the head produces a reference signal when reading the periodic reference segment, the method comprising the steps of:

integrating the reference signal to generate an area signal;

detecting a peak in the reference signal to generate a peak signal;

generating a write condition signal responsive to the area signal and the peak signal that indicates that writing of data in the user data segment during the write operation is unsafe.

16. The method of claim 15 further comprising the step of determining a high-fly write condition.

17. The method of claim 15 further comprising the step of determining a low-fly write condition.

18. The method of claim 15 wherein the step of generating the write condition signal comprises the step of computing a ratio of the area signal to the peak signal.

19. The method of claim 18 wherein the write condition signal indicates an unsafe condition if the ratio is greater than a predetermined threshold.

20. The method of claim 18 wherein the write condition signal indicates an unsafe condition if the ratio is less than a predetermined threshold.

21. A disk drive having a head and a recording surface, wherein the recording surface includes a track having a user data segment and a periodic reference segment, wherein the head flies above the recording surface at a fly-height that varies as the head flies, wherein during a write operation the head writes data in the user data segment, and wherein during the write operation the head produces a reference signal when reading the periodic reference segment, wherein the disk drive comprises:

an integrator for integrating the reference signal to generate an area signal;

a peak detector for detecting a peak in the reference signal to generate a peak signal; and a write condition detector, responsive to the area signal and the peak signal, for generating a fly-height signal indicative of the fly-height of the head.

22. The disk drive of claim 21 wherein the write condition detector comprises a comparator for comparing the area signal to the peak signal.

23. A disk drive having a head and a recording surface, wherein the recording surface includes a track having a user data segment and a periodic reference segment, wherein the head flies above the recording surface at a fly-height that varies as the head flies, wherein during a write operation the head writes data in the user data segment, and wherein during the write operation the head produces a reference signal when reading the periodic reference segment, wherein the disk drive comprises:

a first filter for extracting a fundamental frequency component from the reference signal;

an automatic gain control circuit, responsive to the fundamental frequency component, for controlling an amplitude of the reference signal;

a second filter for extracting a predetermined harmonic frequency component of the reference signal; and a write condition detector for comparing the predetermined harmonic frequency component to a predetermined threshold for generating a fly-height signal indicative of the fly-height of the head.

* * * * *